US012582910B2

(12) United States Patent (10) Patent No.: US 12,582,910 B2
Kano et al. (45) Date of Patent: Mar. 24, 2026

(54) COMPUTER SYSTEM, GAME SYSTEM, AND GAME PROGRESS CONTROL METHOD

(71) Applicant: BANDAI NAMCO ENTERTAINMENT INC., Tokyo (JP)

(72) Inventors: Daisuke Kano, Tokyo (JP); Shota Kuniyoshi, Tokyo (JP); Mizuki Kato, Tokyo (JP); Yuji Koyama, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 454 days.

(21) Appl. No.: 18/105,451

(22) Filed: Feb. 3, 2023

(65) Prior Publication Data

US 2023/0182018 A1 Jun. 15, 2023

Related U.S. Application Data

(63) Continuation of application No. PCT/JP2021/021941, filed on Jun. 9, 2021.

(30) Foreign Application Priority Data

Aug. 6, 2020 (JP) ................................. 2020-133503

(51) Int. Cl.
*A63F 13/58* (2014.01)
*A63F 13/422* (2014.01)
(Continued)
(52) U.S. Cl.
CPC ............ *A63F 13/58* (2014.09); *A63F 13/422* (2014.09); *A63F 13/533* (2014.09); (Continued)

(58) Field of Classification Search
CPC .. A63F 13/422; A63F 13/533; A63F 13/5372; A63F 13/5375; A63F 13/56; A63F 13/58
See application file for complete search history.

(56) References Cited

U.S. PATENT DOCUMENTS 6,283,854 B1 * 9/2001 Niwa ...................... A63F 13/45
463/7
9,480,920 B2 * 11/2016 Ooya ...................... A63F 13/26
(Continued)

FOREIGN PATENT DOCUMENTS

JP 2007-312930 A 12/2007
JP 2010-17395 A 1/2010
(Continued)

OTHER PUBLICATIONS

Aug. 24, 2021 International Search Report issued in International Patent Application No. PCT/JP2021/021941.
(Continued)

*Primary Examiner* — William H McCulloch, Jr.
(74) *Attorney, Agent, or Firm* — Oliff PLC

(57) ABSTRACT
A computer system determines that a player character is in a preparatory state for executing an external function (close-range attack) toward a target character (e.g., enemy character). Furthermore, the computer system determines that the player character satisfies an executable condition that enables execution of the external function. When the player character satisfies the executable condition, the computer system causes the player character to execute the external function. Then, the computer system executes protection control for protecting the player character from another character while the player character is in the preparatory state.

15 Claims, 14 Drawing Sheets

(51) Int. Cl.

| | | |
|---|---|---|
| *A63F 13/533* | (2014.01) | |
| *A63F 13/5372* | (2014.01) | |
| *A63F 13/5375* | (2014.01) | |
| *A63F 13/56* | (2014.01) | |

(52) U.S. Cl.

CPC ...... *A63F 13/5372* (2014.09); *A63F 13/5375* (2014.09); *A63F 13/56* (2014.09)

(56) References Cited

U.S. PATENT DOCUMENTS

| | | | | |
|---|---|---|---|---|
| 11,045,735 | B2 * | 6/2021 | Shimomoto | ............ A63F 13/58 |
| 11,344,811 | B2 * | 5/2022 | Asano | ..................... A63F 13/35 |
| 11,446,569 | B2 * | 9/2022 | Ooya | ..................... A63F 13/26 |
| 12,194,376 | B2 * | 1/2025 | Oono | ..................... A63F 13/49 |
| 12,280,312 | B2 * | 4/2025 | Kim | ......................... A63F 13/42 |
| 2007/0213107 | A1 * | 9/2007 | Itou | ......................... A63F 13/56 463/1 |
| 2014/0011585 | A1 * | 1/2014 | Ando | ..................... A63F 13/00 463/31 |
| 2014/0066210 | A1 * | 3/2014 | Watabe | ................... A63F 13/69 463/42 |
| 2015/0151204 | A1 * | 6/2015 | Yamaguchi | ......... A63F 13/2145 463/31 |
| 2020/0086216 | A1 * | 3/2020 | Shimomoto | ............ A63F 13/58 |
| 2022/0016528 | A1 | 1/2022 | Ichikawa | |
| 2023/0041183 | A1 * | 2/2023 | Shi | ......................... A63F 13/533 |
| 2023/0093949 | A1 * | 3/2023 | Dunaeva | ................. A63F 13/35 463/42 |
| 2023/0182018 | A1 * | 6/2023 | Kano | .................. A63F 13/5375 463/31 |
| 2024/0082724 | A1 * | 3/2024 | Sato | ...................... A63F 13/573 |
| 2024/0082725 | A1 * | 3/2024 | Sato | ................... A63F 13/2145 |
| 2025/0010202 | A1 * | 1/2025 | Kuroda | ................... A63F 13/69 |
| 2025/0050211 | A1 * | 2/2025 | Kuang | ................... A63F 13/55 |
| 2025/0325908 | A1 * | 10/2025 | Kuang | ................... A63F 13/55 |

FOREIGN PATENT DOCUMENTS

| | | |
|---|---|---|
| JP | 2019-211865 A | 12/2019 |
| JP | 2019-213966 A | 12/2019 |
| WO | 2020/110246 A1 | 6/2020 |

OTHER PUBLICATIONS

"Summary, Search and Comparison of Spells Learned at Higher Levels". Aug. 9, 2017, <URL: https://web.archive.org/web/20170809100449/https://dq1030.com/level_magic.html>.

* cited by examiner

PROTECTION CONTENT DEFINITION DATA

| PROTECTION CONTENT ID | PROTECTION CONTENT | SELECTION PROBABILITY |
|---|---|---|
| PROTECTION 01 | DEFENSIVE STRENGTH 0% UP | 1% |
| PROTECTION 02 | DEFENSIVE STRENGTH 20% UP | 20% |
| PROTECTION 03 | DEFENSIVE STRENGTH 50% UP | 78% |
| PROTECTION 04 | DEFENSIVE STRENGTH 100% UP | 1% |

PROTECTION CONTENT DEFINITION DATA

| PROTECTION CONTENT ID | PROTECTION CONTENT | SELECTION PROBABILITY |
|---|---|---|
| PROTECTION 05 | DEFENSIVE STRENGTH 20% UP | 25% |
| PROTECTION 06 | EVADING ABILITY 20% UP | 25% |
| PROTECTION 07 | DEFENSIVE STRENGTH 50% UP | 25% |
| PROTECTION 08 | EVADING ABILITY 100% UP | 25% |

PROTECTION CONTENT DEFINITION DATA

| PROTECTION CONTENT ID | PROTECTION CONTENT | SELECTION PROBABILITY |
|---|---|---|
| PROTECTION 09 | OFFENSIVE STRENGTH 20% DOWN | 20% |
| PROTECTION 10 | GIVEN DAMAGE AMOUNT = 50% LESS THAN NORMAL DAMAGE AMOUNT | 60% |
| PROTECTION 11 | OFFENSIVE STRENGTH 70% DOWN | 15% |
| PROTECTION 12 | GIVEN DAMAGE AMOUNT = 0 | 5% |

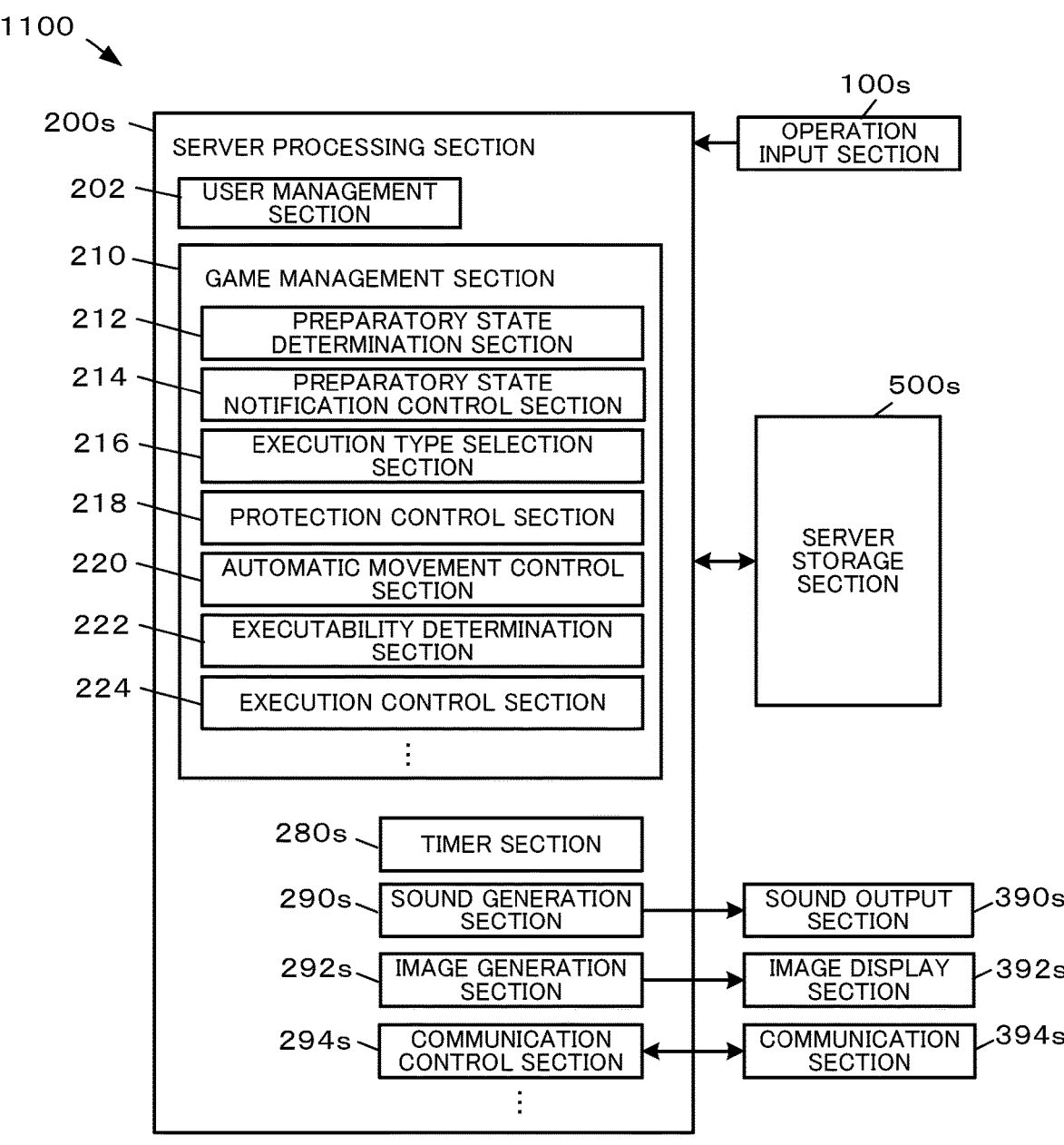

1100

200s — SERVER PROCESSING SECTION

100s — OPERATION INPUT SECTION

202 — USER MANAGEMENT SECTION

210 — GAME MANAGEMENT SECTION

212 — PREPARATORY STATE DETERMINATION SECTION

214 — PREPARATORY STATE NOTIFICATION CONTROL SECTION

216 — EXECUTION TYPE SELECTION SECTION

218 — PROTECTION CONTROL SECTION

220 — AUTOMATIC MOVEMENT CONTROL SECTION

222 — EXECUTABILITY DETERMINATION SECTION

224 — EXECUTION CONTROL SECTION

500s — SERVER STORAGE SECTION

280s — TIMER SECTION

290s — SOUND GENERATION SECTION

390s — SOUND OUTPUT SECTION

292s — IMAGE GENERATION SECTION

392s — IMAGE DISPLAY SECTION

294s — COMMUNICATION CONTROL SECTION

394s — COMMUNICATION SECTION

FIG.8

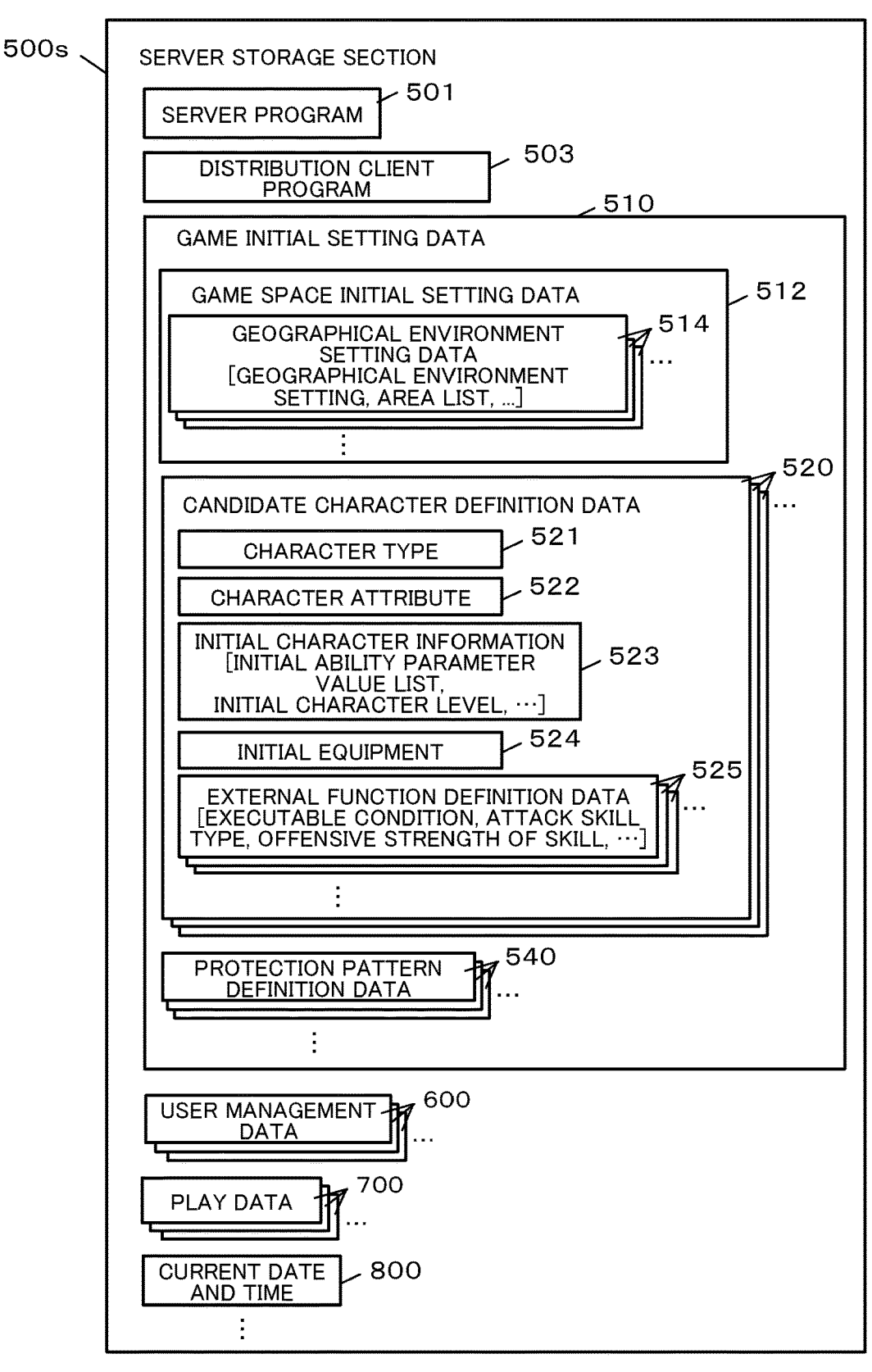

500s

SERVER STORAGE SECTION

SERVER PROGRAM — 501

DISTRIBUTION CLIENT PROGRAM — 503

510
GAME INITIAL SETTING DATA

GAME SPACE INITIAL SETTING DATA — 512

GEOGRAPHICAL ENVIRONMENT
SETTING DATA
[GEOGRAPHICAL ENVIRONMENT
SETTING, AREA LIST, …] — 514
…

520
…
CANDIDATE CHARACTER DEFINITION DATA

CHARACTER TYPE — 521

CHARACTER ATTRIBUTE — 522

INITIAL CHARACTER INFORMATION
[INITIAL ABILITY PARAMETER
VALUE LIST,
INITIAL CHARACTER LEVEL, …] — 523

INITIAL EQUIPMENT — 524

EXTERNAL FUNCTION DEFINITION DATA
[EXECUTABLE CONDITION, ATTACK SKILL
TYPE, OFFENSIVE STRENGTH OF SKILL, …] — 525
…

PROTECTION PATTERN
DEFINITION DATA — 540
…

USER MANAGEMENT
DATA — 600
…

PLAY DATA — 700
…

CURRENT DATE
AND TIME — 800

FIG.14

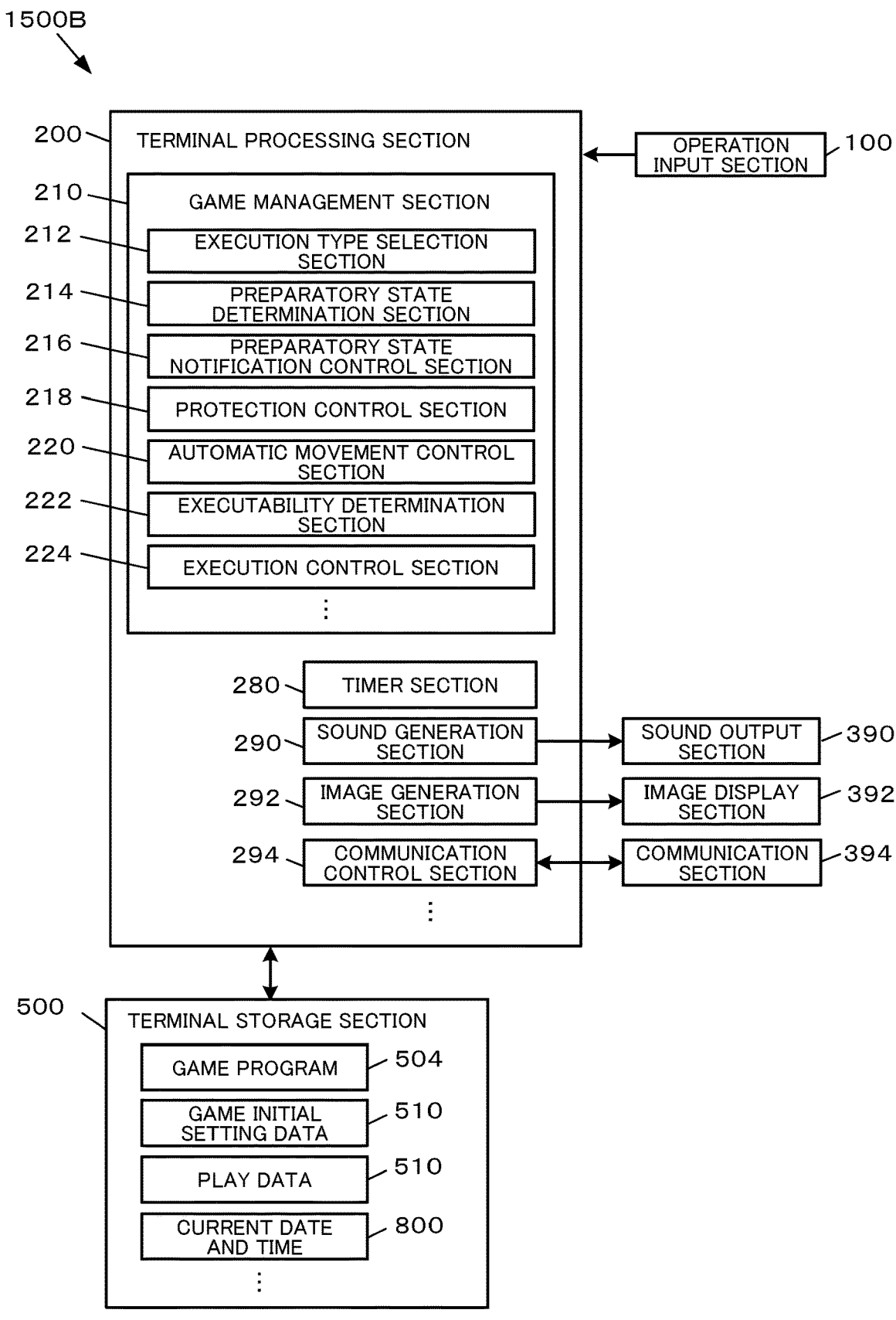

1500B

200 — TERMINAL PROCESSING SECTION

OPERATION INPUT SECTION — 100

210 — GAME MANAGEMENT SECTION

212 — EXECUTION TYPE SELECTION SECTION

214 — PREPARATORY STATE DETERMINATION SECTION

216 — PREPARATORY STATE NOTIFICATION CONTROL SECTION

218 — PROTECTION CONTROL SECTION

220 — AUTOMATIC MOVEMENT CONTROL SECTION

222 — EXECUTABILITY DETERMINATION SECTION

224 — EXECUTION CONTROL SECTION

280 — TIMER SECTION

290 — SOUND GENERATION SECTION

SOUND OUTPUT SECTION — 390

292 — IMAGE GENERATION SECTION

IMAGE DISPLAY SECTION — 392

294 — COMMUNICATION CONTROL SECTION

COMMUNICATION SECTION — 394

500 — TERMINAL STORAGE SECTION

GAME PROGRAM — 504

GAME INITIAL SETTING DATA — 510

PLAY DATA — 510

CURRENT DATE AND TIME — 800

COMPUTER SYSTEM, GAME SYSTEM, AND GAME PROGRESS CONTROL METHOD

CROSS REFERENCE TO RELATED APPLICATION

This application is a continuation of International Patent Application No. PCT/JP2021/021941, having an international filing date of Jun. 9, 2021, which designated the United States, the entirety of which is incorporated herein by reference. Japanese Patent Application No. 2020-133503 filed on Aug. 6, 2020 is also incorporated herein by reference in its entirety.

BACKGROUND

One of the popular genres of video games is a game including an element of attacking an opponent character by a player character operated by a player. Such a game sometimes includes a lock-on function.

The lock-on function is a function that automatically maintains aim of attack at a target character even if a relative position between the player character and the target character of an attack target changes. The player does not need to keep performing operation for taking aim at the target character. With the lock-on function, the player can easily attack the locked-on target character only by operation input for starting an attack while moving the player character in a game space (see Japanese Unexamined Patent Application Publication No. 2007-312930 and Japanese Unexamined Patent Application Publication No. 2010-17395, for example).

The lock-on function is used for a close-range attack as well as a long-range attack such as shooting. For example, assume that the player character is a soldier who is equipped with a gun and also has a strong close-range attack skill. Even if an enemy character is mighty and requires heavy shootings to defeat, the player can quickly lock on the enemy character by identifying an opportunity, move the player character toward the locked-on enemy character, and bring the player character into the enemy character's chest to give a mighty close-range attack so as to defeat the enemy character with one stroke. Such tactics as to charge into the enemy's chest using the lock-on function create a highlight scene for the player to display his/her skill, and thus are popular in match games.

In order to successfully carry out such tactics, important things are identification of timing when to start approaching the target character and decisiveness for approaching the target character in a flash. However, since an approaching movement to the target character is almost a linier movement, the player character tends to be a target of attack from the target character that has found itself locked on or other characters. When the player character receives the attack during the approaching movement, the player character is damaged and the movement slows down or is interrupted. That is, the tactics to charge into the enemy's chest using the lock-on function tend to fail.

Furthermore, in some game specifications, when the player locks on the character of the attack target and performs operation input for the close-range attack, the player character is automatically moved toward the target character until reaching an attack range of the close-range attack to automatically execute the close-range attack toward the target character. In such a case, regardless of the skill of the player, the player character is damaged by the attack during the movement, and thus there is always a risk of failure in the close-range attack due to this damage.

A situation such that the player character becomes unable to accomplish an attempted external move on the way to the locked-on target due to external interference arises not only in the close-range attack using the locked-on function. A similar situation arises, for example, when the player character receives the attack and is interrupted on the way to a friend character in a dying condition to heal. Thus, similar problems exist in various situations.

BRIEF DESCRIPTION OF THE DRAWINGS

FIG. 6A is a diagram illustrating a data configuration example of protection content definition data.

FIG. 6B is a diagram illustrating a data configuration example of the protection content definition data.

FIG. 6C is a diagram illustrating a data configuration example of the protection content definition data.

FIG. 7 is a functional block diagram illustrating a functional configuration example of a server system according to a first embodiment.

FIG. 8 is a diagram illustrating an example of programs and data stored in a server storage section according to the first embodiment.

FIG. 14 is a functional block diagram illustrating a functional configuration example of a player terminal according to a second embodiment.

DESCRIPTION OF EXEMPLARY EMBODIMENTS

Figure 1:
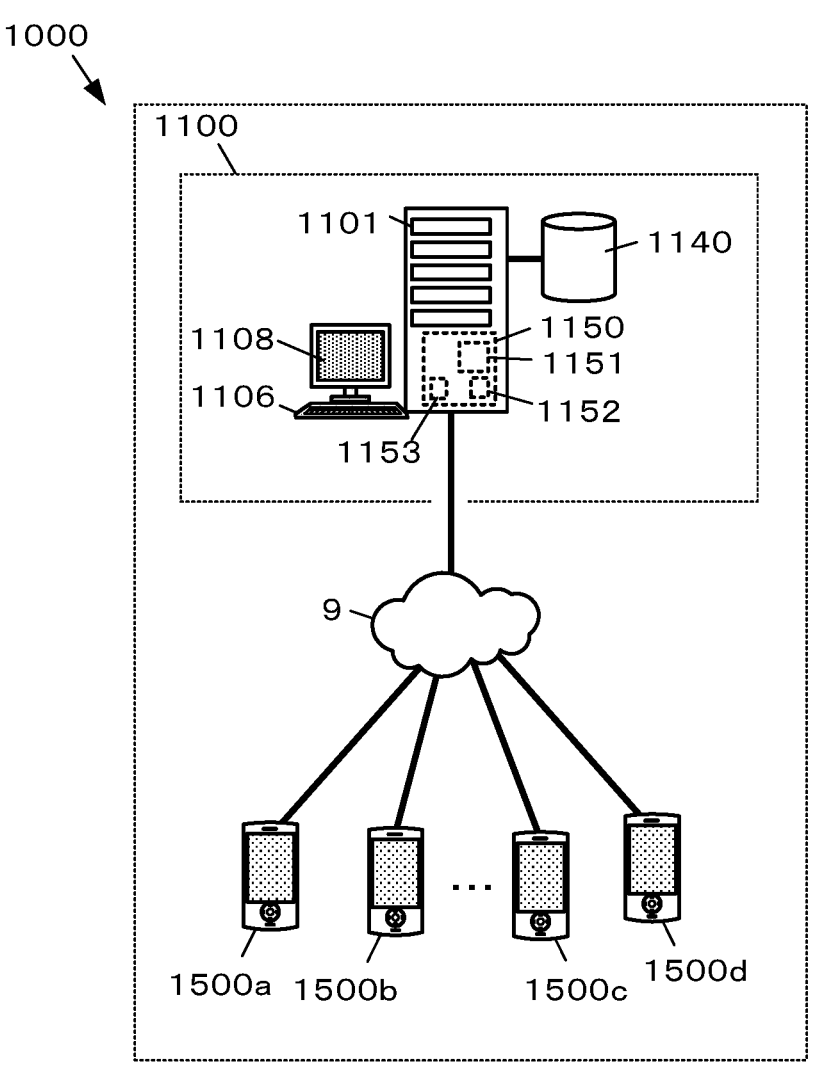
FIG. 1 is a diagram illustrating a configuration example of a game system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

A first disclosure is a computer system comprising:

at least one processor or circuit programmed to:

determine whether a player character is in a preparatory state that satisfies a given preparatory condition for executing a given external function toward a given target character;

determine whether the player character satisfies a given executable condition;

perform control for causing the player character to execute the external function upon determination of satisfaction of the executable condition; and execute protection control for protecting the player character from another character while the player character is in the preparatory state.

The computer system used here may be implemented by a single computer, of course, or a plurality of computers in cooperation. The external function is a function that affects the target character, and meaning in a game can vary depending on a relationship between the player character and the target character in the game, such as attack, healing, or rescue.

According to the disclosure, in some embodiments, the computer system can protect the player character from interference by another character as long as the player character is in the preparatory state satisfying the preparatory condition that is a prerequisite for executing the external function until the player character satisfies the given executable condition.

In a situation of performing a close-range attack using a lock-on function, as long as the player character locks on an enemy character (as long as the player character is in the preparatory state), the player character is protected from the attack from another character (not only the enemy character but also any other character) during approaching movement until getting into an enemy character's chest (until satisfying the executable condition), and a possibility of interruption of the close-range attack due to damage caused during the approaching movement becomes smaller than a possibility without the protection control. That is, a user is supported.

In accordance with a second disclosure, there is provided the computer system, wherein the at least one processor or circuit is further programmed to execute control for notifying a player that the player character is in the preparatory state while the player character is in the preparatory state.

According to the disclosure, in some embodiments, it is possible to clearly indicate to the player that the player character is in the preparatory state. In the situation of performing the close-range attack using the lock-on function, it is possible to clearly indicate to the player that the player character locks on the enemy character. Accordingly, quality of user support is improved compared with a configuration not clearly indicating the preparatory state.

In accordance with a third disclosure, there is provided the computer system, wherein the executable condition is a condition that a positional relationship between the player character in the preparatory state and the target character enables execution of the external function, and a condition at least including that the player character approaches within a predetermined distance from the target character, and wherein the at least one processor or circuit is further programmed to automatically move the player character to within the predetermined distance from the target character when the player character is determined to be in the preparatory state.

The positional relationship used here includes a relative distance and a relative direction. The positional relationship may be three-dimensional as well as two-dimensional.

According to the disclosure, in some embodiments, the computer system performs control for automatically moving the player character to approach the target character. Accordingly, even when the approaching movement of the player character toward the target character is automated in a game specification, the same advantageous effects as those provided by first or second disclosure can be provided.

Preferably, content of support control is set as appropriate according to game rules and game content.

In accordance with a fourth disclosure, there is provided the computer system, wherein executing the protection control includes executing control for reducing a given damage amount to the player character caused by attack from the other character as the protection control.

In accordance with a fifth disclosure, there is provided the computer system, wherein executing the protection control includes reducing the given damage amount by at least one of reducing offensive strength of the other character and enhancing defensive strength of the player character.

According to the disclosure, in some embodiments, the computer system implements the protection control by reducing the damage caused by the attack from the other character, which is a most basic external interference in a match game. When a flow from the preparatory state to the execution of the external function is seen from a player's view point, it looks as if the player character successfully achieves a goal while receiving the attack from the enemy. That is, this can provide climatic scene-like stage effects and provide fun to the player.

In accordance with a sixth disclosure, there is provided the computer system, wherein executing the protection control includes performing adjustment control of protection related to the protection control.

According to the disclosure, in some embodiments, since the computer system can change a protection degree, effects of the protection control do not become too obvious, and thus the user support can be implemented naturally. Furthermore, changes in the effects of the protection control can reduce mannerism in the protection.

In accordance with a seventh disclosure, there is provided the computer system, wherein executing the protection control includes performing the adjustment control based on a positional relationship between the player character and the other character.

According to the disclosure, in some embodiments, the computer system can adjust the protection according to the positional relationship between the player character and the target character. For example, the protection is set to increase as the relative distance becomes shorter. In a situation where the player character rushes at the target character, the protection is light when the player character is still far from the target character. Accordingly, it is possible to impress the player that the player character is damaged even while rushing. This impression makes the player feel thrilled wondering if the player character can reach the target character safely. Then, since the protection increases as the player character approaches closer to the target character, the player has urgent feeling like "Almost there, hold on (so that the player character does not become immovable due to accumulation of the damage)!". Then, the flow from the approach to the execution of the external function is successfully implemented while the player's feeling rises from the thrilled feeling to the urgent feeling. As a result, exhilaration at the time of success of the external function execution can be enhanced compared with the case without the protection control.

In accordance with an eighth disclosure, there is provided the computer system, wherein executing the protection control includes performing the adjustment control based on character information of the player character.

In accordance with a nineth disclosure, there is provided the computer system, wherein executing the protection control includes performing the adjustment control based on character information of the other character.

The character information used here is information managed in association with the relevant character. For example, the character information includes a type of the character, play performance in the game, an experience value or a level assigned according to a fighting result of the relevant character, a type of skill that the character has acquired, or the like.

In accordance with a tenth disclosure, there is provided the computer system, wherein executing the protection control includes performing the adjustment control based on moving speed of the player character.

For example, in a situation where the player character moves toward another character in a battle field where bullets come from many directions, if the protection degree is the same both when slowly moving and when rushing with full speed, the realism is impaired. According to the disclosure, in some embodiments, since the computer system performs the adjustment control based on the moving speed of the player character, the protection control can be provided with the realism.

In accordance with an eleventh disclosure, there is provided the computer system, wherein executing the protection control includes performing the adjustment control based on a geographical environment of a position of the player character.

The geographical environment used here is a geographical feature, a climate, and a category of vegetation of the position. For example, the geographical environment is a characteristics category of a battle field set in a game space. For example, the geographical environment includes a flatland, a sandy place, underwater, a dense fog area, a forest area, or the like. A type of the geographical environment is not limited to a category generally seen on the earth in reality.

According to the disclosure, in some embodiments, since the computer system can change the protection degree according to the geographical environment of the position of the player character, it is possible to make the player feel as if the geographical environment affects the protection, and thus enhance the realism of the game.

In accordance with a twelfth disclosure, there is provided the computer system, wherein the external function includes a plurality of types, and wherein the at least one processor or circuit is further programmed to previously select one of the plurality of types of the external functions to be executed when the executable condition is satisfied based on operation input by a player before the executable condition is satisfied, and wherein executing the protection control includes performing the adjustment control based on the type of the external function selected.

According to the disclosure, in some embodiments, since the player can select the type of the external function to be executed, the quality of the user support can be improved.

In accordance with a thirteenth disclosure, there is provided the computer system, wherein executing the protection control includes performing the adjustment control using a given probability calculation.

In accordance with a fourteenth disclosure, there is provided the computer system, wherein executing the protection control includes determining a probability related to an adjustment degree, and performing the adjustment control using a probability calculation according to the probability determined.

According to the disclosure, in some embodiments, the computer system can add an uncertain element to the adjustment of the protection control. Accordingly, when seen from the player's view point, the adjustment of the protection varies at each occasion even in similar situations, and thus the player can feel it natural that the protection control has happened that way by chance.

A fifteenth disclosure is a game system comprising:

a server system that is the computer system; and an operation terminal used by a player to perform gameplay.

According to the disclosure, in some embodiments, the game system that provides the effects similar to those provided by the computer system described above can be implemented.

A sixteenth disclosure is a game progress control method executed by a computer system for controlling progress of a game, the method comprising:

determining whether a player character is in a preparatory state that satisfies a given preparatory condition for executing a given external function toward a given target character;

determining whether the player character satisfies a given executable condition;

performing control for causing the player character to execute the external function upon determination of satisfaction of the executable condition; and executing protection control for protecting the player character from another character while the player character is in the preparatory state.

According to the disclosure, in some embodiments, the game progress control method that provides the effects similar to those in the first disclosure can be implemented.

Exemplary embodiments are described below. Note that the following exemplary embodiments do not in any way limit the scope of the content defined by the claims laid out herein. Note also that all of the elements described in the present embodiment should not necessarily be taken as essential elements Hereinafter, examples of embodiments of the present disclosure are described. Note that modes to which the present disclosure is applicable are not limited to the following embodiments.

First Embodiment

FIG. 1 is a diagram illustrating a configuration example of a game system.

A game system 1000 includes a server system 1100 and a player terminal 1500 (1500*a*, 1500*b*, . . . ) that are connected via a network 9 to perform mutual data communication. Although FIG. 1 illustrates only four player terminals 1500 (1500*a*, 1500*b*, . . . ), more player terminals 1500 can access the server system 1100 in actual system operation.

The game system 1000 is a computer system that provides an online game to a player who is a user using the player terminal 1500. The game system 1000 may provide any other services, in addition to the online game, of course.

The network 9 means a communication channel capable of data communication. That is, the network 9 inclusively means a communication network such as a local area network (LAN) using a private line (a private cable) for direct connection or Ethernet (registered trademark), a telecommunication network, a cable network, and an Internet. A communication method may be a cable communication method or a wireless communication method.

The server system 1100 is a computer system that includes, for example, a main body device 1101, a keyboard 1106, a touch panel 1108, and a storage 1140, and a control board 1150 is mounted in the main body device 1101.

The control board 1150 includes a microprocessor of various such as a central processing unit (CPU) 1151, a graphics processing unit (GPU), or a digital signal processor (DSP), an IC memory 1152 of various types such as a VRAM, a RAM, or a ROM, and a communication device 1153. The control board 1150 may be implemented partially or entirely by an application specific integrated circuit (ASIC), a field-programmable gate array (FPGA), or a system on a chip (SoC).

Through a calculation process performed by the control board 1150 based on predetermined programs and data, the server system 1100 implements a user management function for managing information related to user registration or the like and a game management function for performing game progress control. That is, the server system 1100 functions as a game server that provides a kind of client-server online game.

The server system 1100 is illustrated as including only one server device. However, the server system 1100 may be implemented by a plurality of devices. For example, the server system 1100 may be configured such that a plurality of blade servers are connected together via an internal bus in a data communicable manner to share the functions. Hardware included in the server system 1100 may be installed anywhere. The server system 1100 may be configured such that a plurality of independent servers installed at separate places perform data communication via the network 9 to function as the server system 1100 as a whole.

Figure 2:
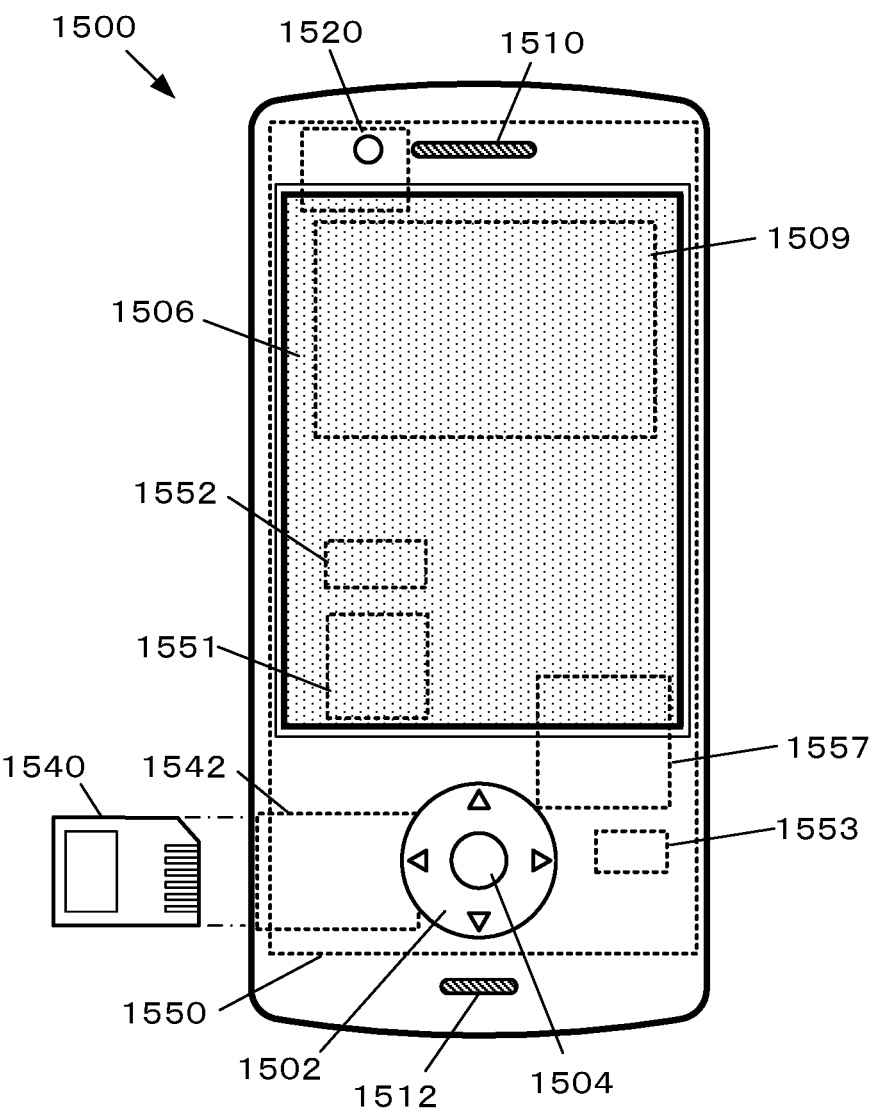
FIG. 2 is a front view of a configuration example of a player terminal.

FIG. 2 is a front view of a configuration example of the player terminal 1500. The player terminal 1500 is a computer system that is used by a registered user to use the game system 1000 according to the present embodiment, and is an electronic apparatus (an electronic device) that can access the server system 1100 via the network 9. That is, the player terminal 1500 is an operation terminal used by the user to play the game.

The player terminal 1500 illustrated in FIG. 2 is a device known as a smartphone. The user terminal 1500 may also be a wearable computer such as a smartwatch or smartglasses, a portable game device, a tablet computer, a personal computer, or the like. When a plurality of electronic devices, such as a combination of a smartphone and a smartwatch capable of establishing a communication connection with the smartphone, are communicably connected and perform a single function, the plurality of electronic devices may be considered as a single player terminal 1500.

The player terminal 1500 includes an arrow key 1502, a button switch 1504, a touch panel 1506, a built-in battery 1509, a speaker 1510, a microphone 1512, a camera 1520, a control board 1550, and a memory card reader 1542 capable of writing and reading data on and from a memory card 1540. The touch panel 1506 functions as an image display device and a touch position input device. The memory card 1540 is a computer readable storage medium. The player terminal 1500 further includes a power button, a volume control button, or the like (not illustrated). Furthermore, the player terminal 1500 may include an IC card reader capable of implementing contactless writing and reading of data on and from an IC card, such as a credit card or a prepaid card, that can be used to pay a cost for using the game system 1000 or the like.

The control board 1550 includes (1) a microprocessor of various types such as a CPU 1551, a GPU, or a DSP, (2) an IC memory 1552 of various types such as a VRAM, a RAM, or a ROM, (3) a wireless communication module 1553 for performing wireless communication with a mobile phone base station, a wireless LAN base station, or the like connected to the network 9, and (4) an interface circuit 1557, for example.

The interface circuit 1557 includes (1) a driver circuit for the touch panel 1506, (2) a circuit that receives signals from the arrow key 1502 and the button switch 1504, (3) an output amplifier circuit that outputs sound signals to the speaker 1510, (4) an input signal generation circuit that generates signals corresponding to the sounds collected by the microphone 1512, (5) a circuit that inputs image data of an image photographed by the camera 1520, and (6) a signal input-output circuit for the memory card reader 1542, for example.

These elements mounted on the control board 1550 are electrically connected with each other via a bus circuit or the like to exchange data and signals. The control board 1550 may be partially or entirely implemented by an ASIC, an FPGA, or an SoC. The control board 1550 stores programs and various types of data for implementing a function of the player terminal in the IC memory 1552.

According to the present embodiment, the player terminal 1500 downloads programs and various types of setting data from the server system 1100. Alternatively, the player terminal 1500 may read the programs and the data from a storage medium such as the memory card 1540 additionally provided.

Next, a game is described.

Figure 3:
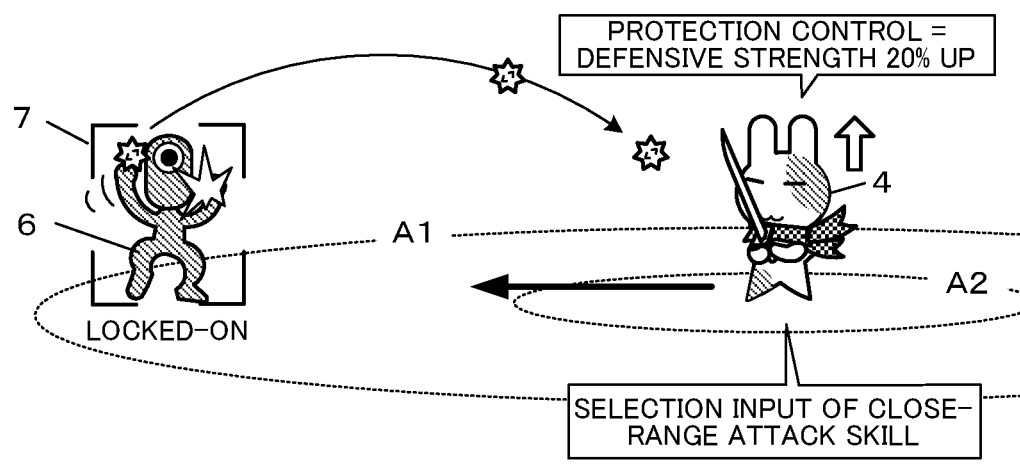
FIG. 3 is a diagram for describing a game and is a schematic diagram (part 1) illustrating an example of protection control.

FIG. 3 is a diagram for describing the game.

The online game provided by the game system 1000 is a game including a plurality of characters, and a player enjoys it by operating a player character capable of executing a given external function toward a given target character.

In particular, each player determines a player character 4 to operate from a plurality of candidate characters before the game starts, and participates in the game.

In a game space built to include various objects in a three-dimensional virtual space, the player character 4 and many enemy characters 6 of non-player characters (NPCs) are disposed. The player performs the gameplay with an aim to attack and defeat all the enemy characters 6 by the player character 4. That is, the game is a battle game advanced by executing the external function of the attack toward the target character of the enemy character. Details of game rules may be modified as appropriate. For example, the enemy character 6 may be a player character operated by a player in an enemy team instead of the NPC.

The player character 4 is prepared with various attack skills corresponding to a type of the candidate character selected by the player. The attack skills include a long-range attack that can be executed from distance and a close-range attack that can be executed by approaching closely to the target character. As for a positional relationship condition between the player character 4 and the enemy character (target character) 6 that should be satisfied to execute the external function, when focusing on a relative distance between the characters, the relative distance is larger in the long-range attack and smaller in the close-range attack.

The long-range attack can be executed from far away from the enemy character 6. On the contrary, the close-range attack requires that the player character move to approach closely to the enemy character 6, which includes a high risk of being damaged during the approaching movement. However, since capability of the close-range attack is much larger than capability of the long-range attack, the close-range attack can give lethal damage with one stroke depending on how to use it.

Accordingly, one of tactics that the player can adopt is restraining the movement of the enemy character 6 while reducing hit points of the enemy character 6 by locking on the enemy character 6 and performing the long-range attacks. Then, the player switches from the long-range attack to the close-range attack at a crucial opportunity, and rushes at the enemy character 6 to defeat the enemy character instantly by the close-range attack. The hit points are also called physical strength, for example, and are one of ability parameter values. The hit points decrease upon reception of the damage down to zero, at which point the player character is considered to be defeated.

The tactics to charge into the enemy character's 6 chest to finish it off require identification of timing and courage to charge into the enemy character's chest at the risk of damage. Accordingly, the tactics are popular because of exhilaration and a sense of accomplishment obtained when the player successfully defeats the enemy character 6 with one stroke. The tactics create a highlight scene for the player to display his/her skill.

In order to successfully carry out the tactics, important things are the identification of the timing and quick charge into the enemy character's 6 chest without hesitation. This is because the charging movement into the enemy character's 6 chest is almost the linier movement, and thus the player character tends to be the target of the attack from not only the locked-on enemy character 6, but also other characters. When the player character 4 receives the attack during the charging movement, the player character is damaged and the movement slows down or is interrupted.

Accordingly, the game system 1000 provides user support to reduce the possibility of the failure of the tactics by protecting the player character 4 moving toward the enemy character 6 and reducing the damage caused by the attack received during the charging movement compared with the damage caused without the protection.

Figure 4:
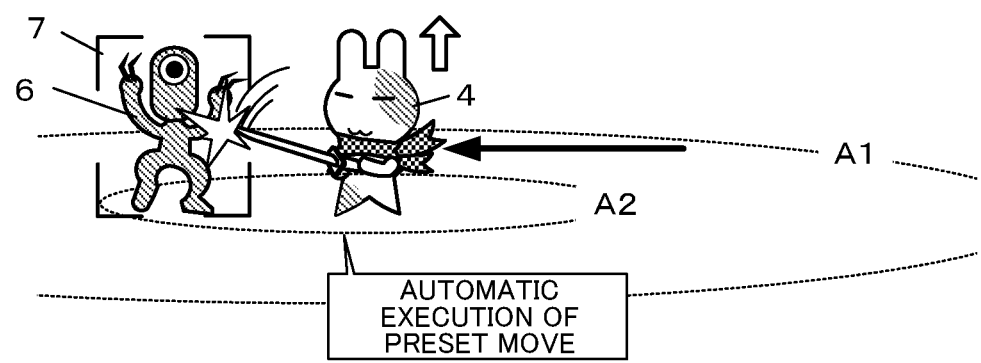
FIG. 4 is a schematic diagram (part 2) illustrating the example of the protection control.

In particular, as illustrated in FIG. 3, when the player causes the player character 4 to perform the close-range attack, the player first performs selection operation for selecting the enemy character 6 as an attack target out of the enemy characters 6 within a lock-on range A1. The enemy character 6 selected by the selection operation is maintained in a selected state as the attack target unless the selection is cancelled. The enemy character is, so to speak, locked on. Then, when the player selects and inputs a type of the close-range attack while locking on the enemy character, the player character 4 is controlled to automatically approach the locked-on target character, as illustrated in FIG. 4. Once the locked-on enemy character 6 comes in a close-range attack range A2 enabling the close-range attack, the player character 4 is controlled to automatically execute the close-range attack of the selected type.

That is, when the player locks on the enemy character 6, the player character 4 becomes a preparatory state satisfying a given preparatory condition for executing the external function toward the target character. Then, when the player character 4 in the preparatory state satisfies a given executable condition, the player character 4 is controlled to automatically execute the external function. Satisfying the executable condition in this case corresponds to a state where a positional relationship between the player character 4 and the target character (enemy character 6) satisfies a given positional relationship condition for enabling the execution of the external function (close-range attack). Meanwhile, the game system 1000 executes protection control for protecting the player character 4 in the preparatory state from the other characters.

Protection content may be set as appropriate. However, the control is performed such that at least the damage calculated when the player character 4 receives the attack during the approaching movement toward the locked-on enemy character 6 becomes smaller than the damage without the protection.

In particular, a value of a concerned parameter concerning the damage calculation is modified. Specifically, as illustrated in FIG. 3, defensive strength of the player character 4 is temporarily enhanced at least during the approaching movement to reduce a damage amount received compared with a damage amount without enhancement. In addition, the concerned parameter includes an evading ability that determines whether the relevant attack hits the player character 4, capability of the attack that causes the damage, a lottery probability of lottery processing that determines the damage amount of the relevant attack, or the like. The damage amount caused to the player character 4 may be reduced by modifying any of these parameters.

Figure 5:
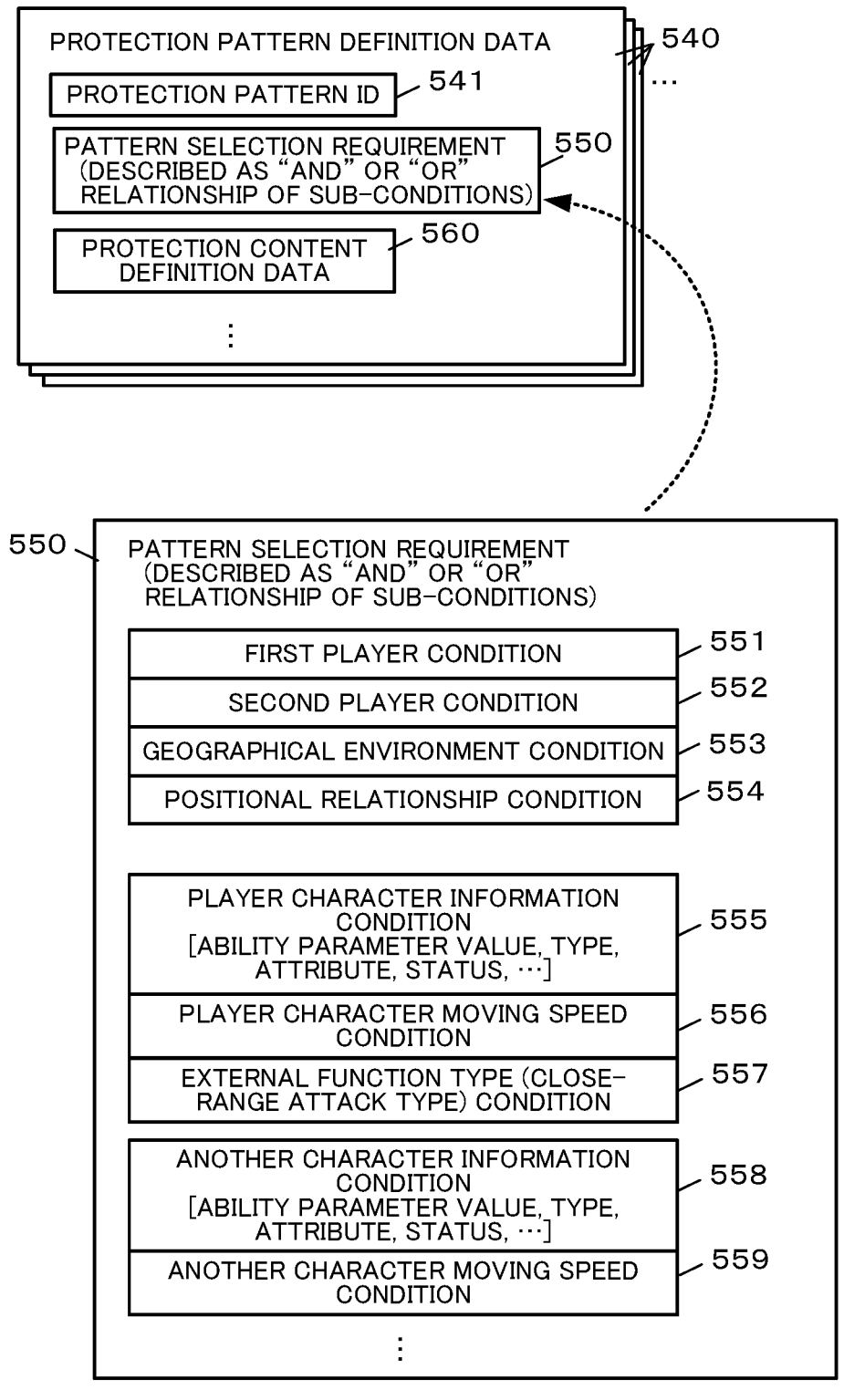
FIG. 5 is a diagram illustrating a data configuration example of protection pattern definition data.

As illustrated in FIG. 5, the game system 1000 previously prepares a plurality of types of protection pattern definition data 540 describing how to modify a value of which concerned parameter, and selects and applies the protection pattern definition data 540 suitable for a game progress status at the time as appropriate.

One piece of the protection pattern definition data 540 includes a unique protection pattern ID 541, a pattern selection requirement 550, and protection content definition data 560.

The pattern selection requirement 550 describes the game progress status that should be satisfied to select and apply the relevant protection pattern. The pattern selection requirement 550 is described as an AND or OR relationship of a plurality of sub-conditions. The plurality of sub-conditions may be set as appropriate in accordance with game content, settings of the player character 4 in the game, or the like. For example, (1) a first player condition 551 that is a condition related to a first player who is the player operating the player character 4, (2) a second player condition 552 that is a condition related to a player of another character (either the target character or a character other than the target character) that has attacked the player character 4 moving (including a temporary state of speed=0) toward the locked-on enemy character 6 (target character), (3) a geographical environment condition 553 of a place where the player character 4 is, and (4) a positional relationship condition 554 between the player character 4 and the locked-on target character can be used.

The first player condition 551 and the second player condition 552 are conditions related to a player level, a title, a number of times of play, an accumulated play time, or the like. The player level is automatically assigned for indicating how high the player's skill is in accordance with a play performance of the relevant player in the past.

By appropriately setting the first player condition 551, the second player condition 552, and the protection content definition data 560, the protection may be entirely (or mostly) removed for a high-skilled player satisfying a given high skill condition to allow the high-skilled player to feel his/her real ability. In such a case, it is preferable that the high-skilled player be notified that no protection is provided. Furthermore, by appropriately setting the first player condition 551, the second player condition 552, and the protection content definition data 560, it is possible to produce a closer match by compensating a difference in the skill between the players, or produce as if a success rate of the close-range attack rises as the player plays the game more, so as to stimulate the player to play the game more.

The geographical environment condition 553 is a condition related to an environmental setting or a setting category of a place such as a geographical feature, a climate, or vegetation set in the game space. For example, the geographical environment may include a city area, a meadow, a sandy place, a forest, a swamp, underwater, dense fog, a thunderstorm, daytime, shade, a valley, a ridgeline, on a bridge, or the like. A type of the geographical environment is not limited to a category generally seen on the earth in reality. In addition, when a game stage is a building or a large structure (e.g., a large ship or a large space ship), the category of the geographical environment may include a large room, a small room, a corridor, a connecting corridor, presence of a light, intensity of light, or the like. The geographical environment condition 553 can be described by one or a combination of some of these types of the geographical environments.

By appropriately setting the geographical environment condition 553 and the protection content definition data 560, a protection degree can be varied according to the place. Furthermore, if the player notices that the protection degree varies depending on the geographical environment, the player can enjoy developing a strategy using the geographical environment.

The positional relationship includes a relative distance and a relative direction. The positional relationship may be three-dimensional as well as two-dimensional. Accordingly, the positional relationship condition 554 can be described by one or a combination of some of a relative distance between the player character 4 and the locked-on enemy character 6, a relative direction (e.g., whether the player character 4 is in front of the enemy character 6 or behind the enemy character 6), a difference in elevation, and the like.

By appropriately setting the positional relationship condition 554 and the protection content definition data 560, it is possible to provide proper user support while moderately producing a sense of thrill about whether the player character can successfully approach the enemy character 6. For example, the protection degree is set low when the relative distance is long, and is set to rise as the relative distance becomes shorter. Accordingly, when the player character 4 starts approaching the enemy character 6, a certain degree of damage is caused by the attack, and thus the player is thrilled like "Can I charge into the enemy's chest all right!?". However, as the player character 4 approaches closer to the enemy character, the protection degree increases in internal processing, and thus the damage caused to the player character 4 decreases and the success rate of the close-range attack rises.

Furthermore, it is also preferable to make the protection degree vary according to the relative direction by appropriately setting the positional relationship condition 554 and the protection content definition data 560. For example, the protection is increased when the player character rushes at the enemy character 6 from the front so as to produce exhilaration obtained by the successful close-range attack through heavy counterattacks from the enemy character 6. On the other hand, the protection is reduced or removed when the player character rushes at the enemy character 6 from behind so as to produce a high-risk high-return situation where the player character is not easily noticed by the enemy character 6, but once noticed and counterattacked, the damage becomes larger than the damage caused by a frontal attack. This provides the player with fun to select the tactics about from which direction the player character launches the close-range attack in consideration of differences in the progress and the damage expected afterward depending on the relative direction of approach.

Furthermore, the sub-conditions related to the player character 4 available for describing the pattern selection requirement 550 can include a player character information condition 555, a player character moving speed condition 556, and an external function type condition 557. Similarly, the sub-conditions related to another character (either the target character or a character other than the target character) that has attacked the player character 4 moving (including a temporary state of speed=0) toward the locked-on enemy character 6 (target character) can include an another character information condition 558 and an another character moving speed condition 559.

The character information used in the player character information condition 555 and the another character information condition 558 is information related to a state of the relevant character managed in association with the relevant character. In particular, the character information can include a character type, a character attribute, an ability parameter value, status, and equipment information.

The character type is determined by the type of the candidate character selected as the player character 4. Each of the candidate characters is assigned with one of predetermined types of attributes. Accordingly, once the character type is determined, the character attribute is automatically determined.

A combination of the character type and the character attribute is appropriately set in the player character information condition 555 and the another character information condition 558, and the protection degree is set to vary according to a type of the combination in the protection content definition data 560. As a result, a compatible relationship between the character launching the close-range attack and the character receiving the attack is created, and this can provide the player with fun to select the tactics about which type of the enemy character 6 to attack first.

The ability parameter value is a parameter value describing a latest state of ability that the relevant character has. For example, an item used as the ability parameter value can be selected as appropriate according to the game content from a character level, an experience value, hit points, offensive strength, defensive strength, mobility, evading ability, or the like that are index values indicating strength of the character.

For example, by setting the protection degree to increase as the ability parameter value of the defensive strength or the evading ability rises in the corresponding protection content definition data 560, the protection according to the ability of the player character 4 can be provided.

The status is a condition indicating whether the player character 4 or the locked-on enemy character 6 is in a state admitted as specific status in game rules. A type of the status may be set as appropriate. For example, the status may be set to dying, low visibility, paralyzed, or the like. For example, by setting the protection degree especially high when the status of the player character 4 is dying in the corresponding protection content definition data 560, it is possible to fully support the player boldly fighting in spite of his/her dying status. As a result, the game can be made more exciting.

The equipment information is information related to the equipment of the player character 4 or the locked-on enemy character 6. For example, the equipment information includes an equipment name, a number of remaining bullets, durability of the equipment, or the like.

By setting the player character moving speed condition 556 and the protection content definition data 560 to increase the protection degree as the moving speed of the player character 4 becomes faster, the damage caused during the approaching movement can be reduced as the approaching speed becomes faster. As a result, the realism can be enhanced. In addition, this also stimulates the player to approach at high speed, which can create dynamic fighting and bring excitement to the match play.

The external function type condition 557 is a condition related to a type of the external function to be executed by the player character 4. In the example according to the present embodiment, the external function type condition 557 is a condition related to a type of the close-range attack selected by the player. By appropriately setting the external function type condition 557 and the corresponding protection content definition data 560, a significant difference can be provided in the protection degree that the player character can receive according to the type of the close-range attack.

Other sub-conditions may be set as appropriate. Furthermore, these sub-conditions do not have to be used to describe the pattern selection requirement 550, or the content of these sub-conditions may be set to "no restriction" so as to practically put these sub-conditions in an omitted state.

FIGS. 6A to 6C are diagrams illustrating data configuration examples of the protection content definition data 560.

The protection content definition data 560 stores a unique protection content ID 561, protection content 562, and a selection probability 564 in an associated manner. The protection content 562 indicates a type of the parameter to be modified due to the protection control, and an amount or a ratio to be modified, and the selection probability 564 indicates the probability that the relevant protection content is selected.

FIG. 6A illustrates an example of four types of protection content 562 where the types of the parameters to be modified due to the protection control are identical, but the selection probabilities 564 are different. This example indicates that the protection control is implemented such that the defensive strength of the ability parameter values of the player character 4 is temporarily enhanced to temporarily reduce the damage. A number of types of the protection content 562 is not limited to this, and may be set as appropriate. The probabilities assigned as the selection probabilities 564 may also be set as appropriate. The selection probability 564 may also be set to 0% or 100%.

FIG. 6B illustrates an example where the evading ability of the ability parameter values is included in the parameters to be modified. The evading ability affects hit determination (whether the attack has hit the player character in the first place), and the attack misses a target more often as a value of the evading ability increases. Accordingly, the damage caused to the player character 4 is temporarily reduced. Furthermore, this example indicates that the selection probabilities 564 are assigned equally to all the protection content 562.

FIG. 6C indicates an example to modify the offensive strength of the ability parameter values of the character that has attacked the player character 4 in the damage calculation, an example to determine a given damage value to be actually given to the player character 4 as a result of the protection based on a normal damage value calculated similarly to the state without the protection control, and an example to set the given damage value to a specific value.

When the damage is calculated with modification for reducing the offensive strength of the character that has attacked the player character, the damage to be applied to the player character 4 is naturally reduced.

Next, a functional configuration is described.

FIG. 7 is a functional block diagram illustrating a functional configuration example of the server system 1100. The server system 1100 includes an operation input section 100s, a server processing section 200s, a sound output section 390s, an image display section 392s, a communication section 394s, and a server storage section 500s.

The operation input section 100s is a means for inputting various types operation for server management. The operation input section 100s corresponds to the keyboard 1106 in FIG. 1.

The server processing section 200s is implemented, for example, by a processor that is a calculation circuit such as a CPU, a GPU, an ASIC, or an FPGA and an electronic component such as an IC memory. The server processing section 200s controls input and output of data between functional sections including the operation input section 100s and the server storage section 500s. The server processing section 200s performs various calculation processes based on predetermined programs and data, operation input signals from the operation input section 100s, data received from the player terminal 1500, or the like to comprehensively control the operation of the server system 1100.

The server processing section 200s includes a user management section 202, a game management section 210, a timer section 280s, a sound generation section 290s, an image generation section 292s, and a communication control section 294s. Other functional sections may be included as appropriate, of course.

The user management section 202 performs a process related to a user registration procedure, and stores and manages various types of information associated with a user account. In particular, the user management section 202 performs (1) issuing a unique user account to a registered user, (2) storing and managing personal information for each user account, (3) storing and managing saved data related to the game, or the like.

The game management section 210 performs various types of control related to progress control of the game. In particular, the game management section 210 includes a preparatory state determination section 212, a preparatory state notification control section 214, an execution type selection section 216, a protection control section 218, an automatic movement control section 220, an executability determination section 222, and an execution control section 224.

The preparatory state determination section 212 determines whether the player character 4 is in a preparatory state that satisfies a given preparatory condition for executing the external function (close-range attack) toward the locked-on enemy character 6 (target character). In particular, the preparatory state corresponds to a state that the player character 4 locks on the target character.

The preparatory state notification control section 214 performs control for notifying the player that the player character 4 is in the preparatory state while the player character 4 is in the preparatory state. In particular, the preparatory state notification control section 214 performs control for attaching and displaying a locked-on marker 7 (see FIG. 3) on the locked-on enemy character 6.

The execution type selection section 216 previously selects the type of the external function to be executed when the player character satisfies the executable condition based on the selection operation by the player before the player character 4 in the preparatory state satisfies the executable condition. In particular, a plurality of types of the close-range attacks are previously prepared, and a method of the operation input is set for each of the types. Accordingly, the type of the close-range attack input by the player as the operation input for the player character 4 becomes the type of the external function to be executed when the player character satisfies the executable condition.

The protection control section 218 executes the protection control for protecting the player character 4 from the other characters while the player character 4 is in the preparatory state.

In particular, the protection control section 218 executes the protection control by reducing the given damage amount to be given to the player character 4 due to the attack from another character by reducing the offensive strength of the other character and/or increasing the defensive strength of the player character 4.

Furthermore, the protection control section 218 performs adjustment control of the protection related to the protection control based on one or some of (a) the positional relationship between the player character 4 and another character, (b) the character information of the player character 4, (c) the character information of another character, (d) the moving speed of the player character 4, (e) the geographical environment where the player character 4 is positioned, and (f) the type of the external function selected by the execution type selection section 216.

Furthermore, the protection control section 218 determines the probability related to an adjustment degree using a given probability calculation and performs the adjustment control using a probability calculation in accordance with the probability determined.

The adjustment control is executed based on one or a combination of some of (a) to (f) described above. The combination is defined in the pattern selection requirement 550 (see FIG. 5) of the protection pattern definition data 540, and the adjustment degree and the probability related to the adjustment degree are defined in the protection content definition data 560 (see FIGS. 6A to 6C).

The automatic movement control section 220 automatically moves the player character 4 to within a predetermined distance from the target character when the player character 4 is determined to be affirmative by the preparatory state determination section 212. The automatic movement control section 220 may start the automatic movement of the player character 4 in response to predetermined operation input from the player after the affirmative determination by the preparatory state determination section 212.

The executability determination section 222 determines whether the given executable condition is satisfied. In particular, the executability determination section 222 determines, as the given executable condition, whether the positional relationship between the player character 4 in the preparatory state and the target character (locked-on enemy character 6) satisfies the given positional relationship condition for enabling the execution of the external function.

The execution control section 224 performs control for causing the player character 4 to execute the external function when the executability determination section 222 comes to the affirmative determination. That is, the execution control section 224 controls the movement of the player character 4 to cause the player character 4 to execute the close-range attack of the selected type toward the enemy character when the locked-on enemy character 6 is within the attack range of the close-range attack of the selected type.

The timer section 280s uses a system clock to measure a current date and time, a limited time period, or the like.

The sound generation section 290s is implemented by execution of an IC or software for generating sound data and decoding, and generates or decodes sound data of operational sounds, sound effects, BGM, voice speech, or the like related to system management of the server system 1100 or the game. The sound generation section 290s outputs sound signals related to the system management to the sound output section 390s.

The sound output section 390s emits sounds corresponding to the sound signals. The sound output section 390s corresponds to a speaker (not illustrated) included in the main body device or the touch panel 1108 in FIG. 1.

The image generation section 292s generates an image to be displayed on the image display section 392s, and outputs image signals. The image generation section 292s corresponds to a part of a function that generates screens related to the system management of the server system 1100 and various types of screens related to the game (or data to display the screens on the player terminal 1500).

The image display section 392s is implemented by a device for displaying the image such as a flat panel display, a head-mounted display, or a projector. The image display section 392s corresponds to the touch panel 1108 in FIG. 1.

The communication control section 294s performs data processing related to data communication, and implements data exchange with an external device through the communication section 394s.

The communication section 394s connects to the network 9 to implement communication. For example, the communication section 394s is implemented by a transceiver, a modem, a terminal adaptor (TA), a jack for wired communication cable, a control circuit, or the like. The communication section 394s corresponds to the communication device 1153 in FIG. 1.

The server storage section 500s is a storage medium that stores programs and various types of data for implementing various functions for causing the server processing section 200s to comprehensively control the server system 1100. The server storage section 500s is used as a work area for the server processing section 200s, and temporarily stores results of calculations executed by the server processing section 200s in accordance with various types of programs. This function is implemented by an IC memory such as a RAM or a ROM, a magnetic disk such as a hard disk, an optical disk such as a CD-ROM or a DVD, an online storage, or the like. The server storage section 500s corresponds to the storage media such as the IC memory 1152 and the hard disk included in the main body device and the storage 1140 in FIG. 1.

FIG. 8 is a diagram illustrating an example of the programs and data stored in the server storage section 500s. The server storage section 500s according to the present embodiment stores a server program 501, a distribution client program 503, and game initial setting data 510. The server storage section 500s also stores data, sequentially generated and managed, including user management data 600, play data 700, and a current date and time 800. The server storage section 500s also stores other programs and data (e.g., a timer, a counter, or various flags) as appropriate.

The server program 501 is read out and executed by the sever processing section 200s for implementing functions of the user management section 202 and the game management section 210.

The distribution client program 503 is an original of a client program to be provided to the player terminal 1500.

The game initial setting data 510 includes various types of initial setting data required for execution control of the game.

In particular, the game initial setting data 510 includes game space initial setting data 512, candidate character definition data 520, protection pattern definition data 540 (see FIG. 5). Other types of data are included as appropriate, of course.

The game space initial setting data 512 includes various types of initial setting data for building a game space of a stage of the match game. The game space initial setting data 512 includes a plurality of types of geographical environment setting data 514. One of the plurality of types of the geographical environment setting data 514 includes a geographical environment setting and an area list of areas in the game space to which the setting is applied. Position coordinates of the player character 4 in the game space are checked against the area lists, and the geographical environment setting of the matching area list becomes the geographical environment of the current position of the player character 4.

The candidate character definition data 520 is prepared for each type of the candidate character that is an option that the player can use as the player character 4, and stores various types of initial setting data related to the relevant character. One piece of the candidate character definition data 520 includes, for example, a unique character type 521, a character attribute 522, initial character information 523, initial equipment 524, external function definition data 525.

The initial character information 523 includes information such as a list of initial ability parameter values, or an initial character level.

The external function definition data 525 is prepared for each of the types of the external functions (a plurality of types of the long-range attacks and a plurality of types of the close-range attacks, in particular) available for the relevant candidate character, and stores various types of initial setting data for executing the relevant external function and applying effects thereof.

One piece of the external function definition data 525 stores an executable condition, an attack skill type, offensive strength of the skill, execution control data. For the calculation of the damage caused by the relevant external function, a normal given damage amount is determined by comparing total offensive strength of the offensive strength of the skill and basic offensive strength as the ability parameter value of the character with defensive strength on a side that receives the attack. When the offensive strength is modified by the protection control, any of the offensive strength of the skill, the basic offensive strength, and the total offensive strength is modified.

The executable condition includes at least the positional relationship condition between the character on a side executing the relevant external function and the target character on a side receiving the external function. The positional relationship includes a relative distance and a relative direction. The positional relationship may be three-dimensional as well as two-dimensional.

The executable condition may be described by using a condition of an elapsed time since last execution, a condition of an execution frequency since a game start, a condition of an affiliation relationship between the target character and the player character 4, a condition of presence/absence of the skill of the own character, a condition of a character level, a condition of a type of equipment owned by the player character 4, or the like, as appropriate, in addition to the positional relationship. That is, the executable condition may be described by one or some of conditions that can be defined in the player character information condition 555 (see FIG. 5) as appropriate and combined by AND or OR. The positional relationship may be excluded from the executable condition depending on the game content.

Furthermore, according to the present embodiment, different executable conditions are prepared for the long-range attack and the close-range attack. However, the executable condition does not have to be set for each external function or a category of the external function, and may be set as a common condition for all the external functions.

Figure 9:
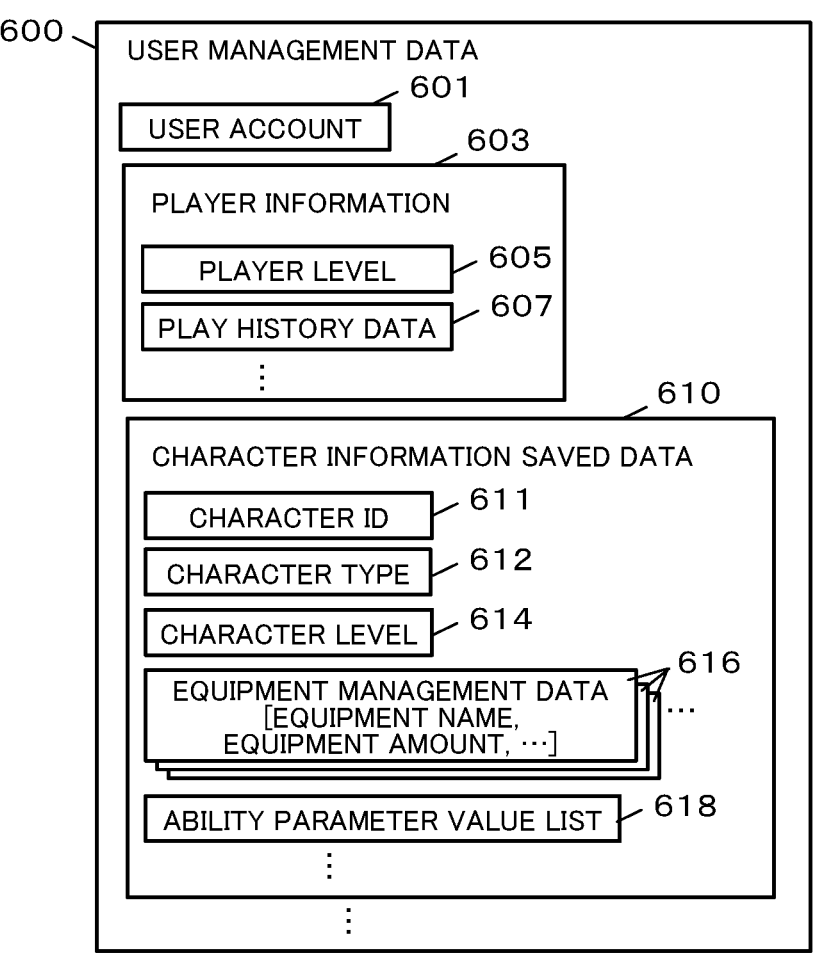
FIG. 9 is a diagram illustrating a data configuration example of user management data.

FIG. 9 is a diagram illustrating a data configuration example of the user management data 600.

The user management data 600 is prepared for each user registered as the player and stores various types of information associated with the relevant user. The user management data 600 includes, for example, a unique user account 601 including a user ID, player information 603, character information saved data 610. Other types of data may be included as appropriate, of course.

The player information 603 includes a player level 605, play history data 607, or the like. Other types of data may be included as appropriate, of course.

The character information saved data 610 is saved data of preceding play. For example, the character information saved data 610 includes a unique character ID 611, a character type 612 indicating which candidate character is used as the player character 4, a character level 614, equipment management data 616, and an ability parameter value list 618. Other types of data may be included as appropriate, of course. The character information saved data 610 is read out at a game start, and updated at a game end.

Figure 10:
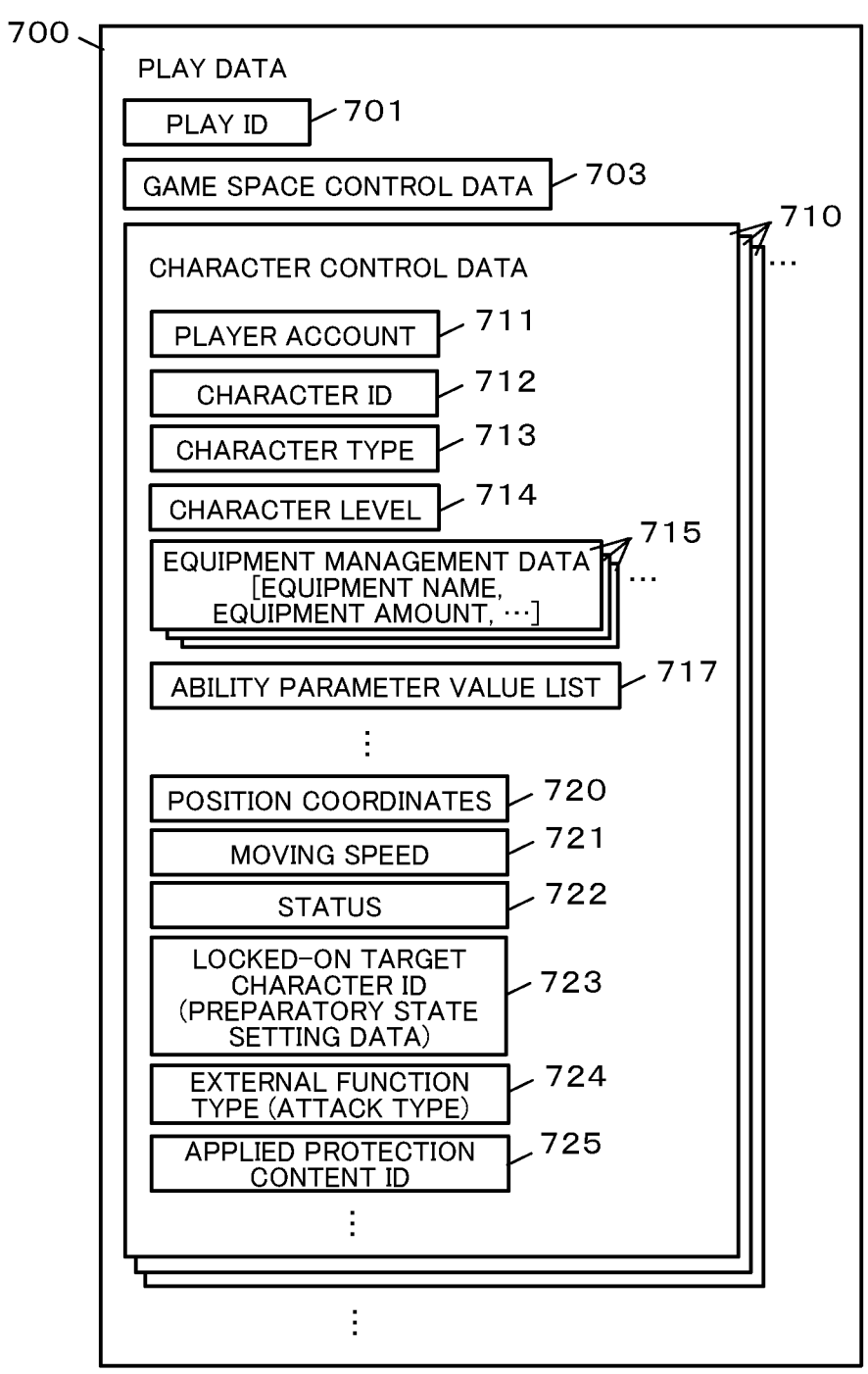
FIG. 10 is a diagram illustrating a data configuration example of play data.

FIG. 10 is a diagram illustrating a data configuration example of the play data 700.

The play data 700 is generated for each gameplay, and stores various types of data describing the game progress status of the relevant gameplay. One piece of the play data 700 includes, for example, a unique play ID 701, game space control data 703, and character control data 710. Other types of data may be included as appropriate, of course.

The character control data 710 is prepared for each character that appears in the game, and stores various types of data describing the latest state of the relevant character. One piece of the character control data 710 includes, for example, a player account 711 (a predetermined value in the case of the NPC), a character ID 712, a character type 713, a character level 714, equipment management data 715, and an ability parameter value list 717. Information from the character ID 712 to the ability parameter value list 717 is copied from corresponding data included in the character information saved data 610 of the user management data 600 of the player before the game start.

The character control data 710 includes, as information for controlling the movement of the relevant character, position coordinates 720, moving speed 721, status 722, a locked-on target character ID 723, an external function type 724, an applied protection content ID 725. Other types of data may be included as appropriate, of course.

The locked-on target character ID 723 stores the character ID of the other character that is locked on by the relevant character. An initial state is set to an initial value indicating being not yet determined (no locked-on character). Once the locked-on target character ID 723 is set to a character ID other than the initial value, the relevant character becomes the preparatory state. When the lock-on is cancelled, the value returns to the original initial value.

The external function type 724 indicates the type of the external function that the relevant character performs to the target character. An initial value is a predetermined value indicating being not yet determined. Once the player inputs attack operation, the type of the input attack operation is stored and the relevant character is controlled to perform the external function (attack) indicated by the external function type 724.

As for the applied protection content ID 725, an initial value is a predetermined value indicating that the protection control is not being performed. When the protection control is performed to the relevant character, the protection content ID 561 of the protection content 562 to be applied is stored.

Figure 11:
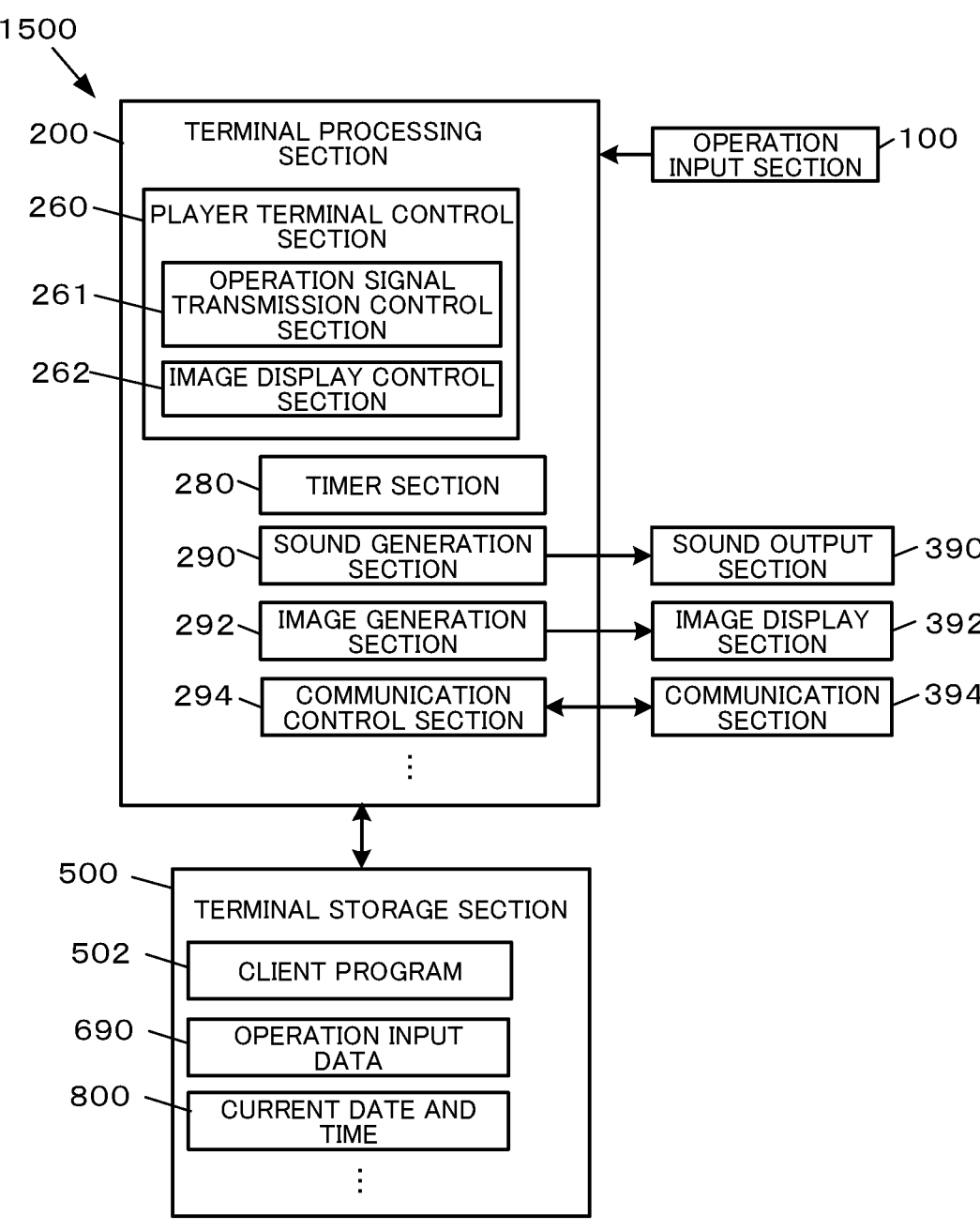
FIG. 11 is a functional block diagram illustrating a functional configuration example of the player terminal according to the first embodiment.

FIG. 11 is a functional block diagram illustrating a functional configuration example of the player terminal 1500. The player terminal 1500 includes an operation input section 100, a terminal processing section 200, a sound output section 390, an image display section 392, a communication section 394, and a terminal storage section 500.

The operation input section 100 outputs operation input signals in accordance with various types of operation input made by the player to the terminal processing section 200. The operation input section 100 can be implemented, for example, by a push switch, a joystick, a touch pad, a track ball, an accelerometer, a gyro, or a CCD module. The operation input section 100 corresponds to the arrow key 1502, the button switch 1504, and the touch panel 1506 in FIG. 2.

The terminal processing section 200 is implemented, for example, by a microprocessor such as a CPU or a GPU and electronic components such as an IC memory. The terminal processing section 200 controls input/output of data to/from the functional sections including the operation input section 100 and the terminal storage section 500. The terminal processing section 200 performs various calculation processes based on predetermined programs and data, operation input signals from the operation input section 100, and various types of data received from the server system 1100 to control operations of the player terminal 1500. The terminal processing section 200 corresponds to the control board 1550 in FIG. 2.

The terminal processing section 200 according to the present embodiment includes a player terminal control section 260, a timer section 280, a sound generation section 290, an image generation section 292, and a communication control section 294.

The player terminal control section 260 performs a control for causing the player terminal 1500 to function as a client device that communicates with the server system 1100. In particular, the player terminal control section 260 includes an operation signal transmission control section 261 and an image display control section 262.

The operation signal transmission control section 261 performs a process of transmitting various types of data and requests to the server system 1100 in accordance with operation performed on the operation input section 100.

The image display control section 262 performs a control for displaying a game screen, various types of operation screens, or the like based on various types of data or the like received from the server system 1100.

The timer section 280 uses a system clock to measure a current date and time, a limited time period, or the like.

The sound generation section 290 is implemented, for example, by a processor such as a digital signal processor (DSP) or a sound synthesizing IC, or an audio codec for playing a sound file, and generates sound signals for music, sound effects, or various types of operational sounds and outputs the signals to the sound output section 390.

The sound output section 390 is implemented by a device that outputs (emits) sounds based on the sound signals input from the sound generation section 290. The sound output section 390 corresponds to the speaker 1510 in FIG. 2.

The image generation section 292 generates and composite images based on the results of processing by the image display control section 262, outputs image signals for displaying these images on the image display section 392, or the like. The image generation section 292 corresponds to the graphics processing unit (GPU) and graphic controller mounted on the control board 1550 in FIG. 2.

The image display section 392 is implemented by a device for displaying images such as a flat panel display, a head-mounted display, or a projector. The image display section 392 corresponds to the touch panel 1506 in FIG. 2.

The communication control section 294 performs data processing related to data communication, and implements data exchange with an external device through the communication section 394.

The communication section 394 connects to the network 9 to implement communication. For example, the communication section 394 is implemented by a wireless communication device, a modem, a terminal adaptor (TA), a jack for wired communication cable, a control circuit, or the like. The communication section 394 corresponds to the wireless communication module 1553 in FIG. 2.

According to the present embodiment, the server system 1100 generates the images of the game screen and various screens. Alternatively, the player terminal 1500 may generate these images. In such a case, the image display control section 262 controls objects disposed in a three-dimensional virtual space for generating 3DCG, for example, and the image generation section 292 renders the 3DCG and executes various controls for generating the game screen.

The terminal storage section 500 is a storage medium that stores programs and various types of data for causing the terminal processing section 200 to implement given functions. The terminal storage section 500 is used as a work area for the terminal processing section 200, and temporarily stores results of calculations executed by the terminal processing section 200 in accordance with the various programs, input data input from the operation input section 100, or the like. These functions are implemented by an IC memory such as a RAM or a ROM, a magnetic disk such as a hard disk, an optical disk such as a CD-ROM or a DVD, or the like. The terminal storage section 500 corresponds to the IC memory 1552 included in the control board 1550 and the memory card 1540 in FIG. 2. The terminal storage section 500 may be implemented by an online storage.

In particular, the terminal storage section 500 stores a client program 502 for causing the terminal processing section 200 to function as the player terminal control section 260, operation input data 690, and a current date and time 800. Other types of data may be stored as appropriate, of course.

Next, operation of the game system 1000 is described.

Figure 12:
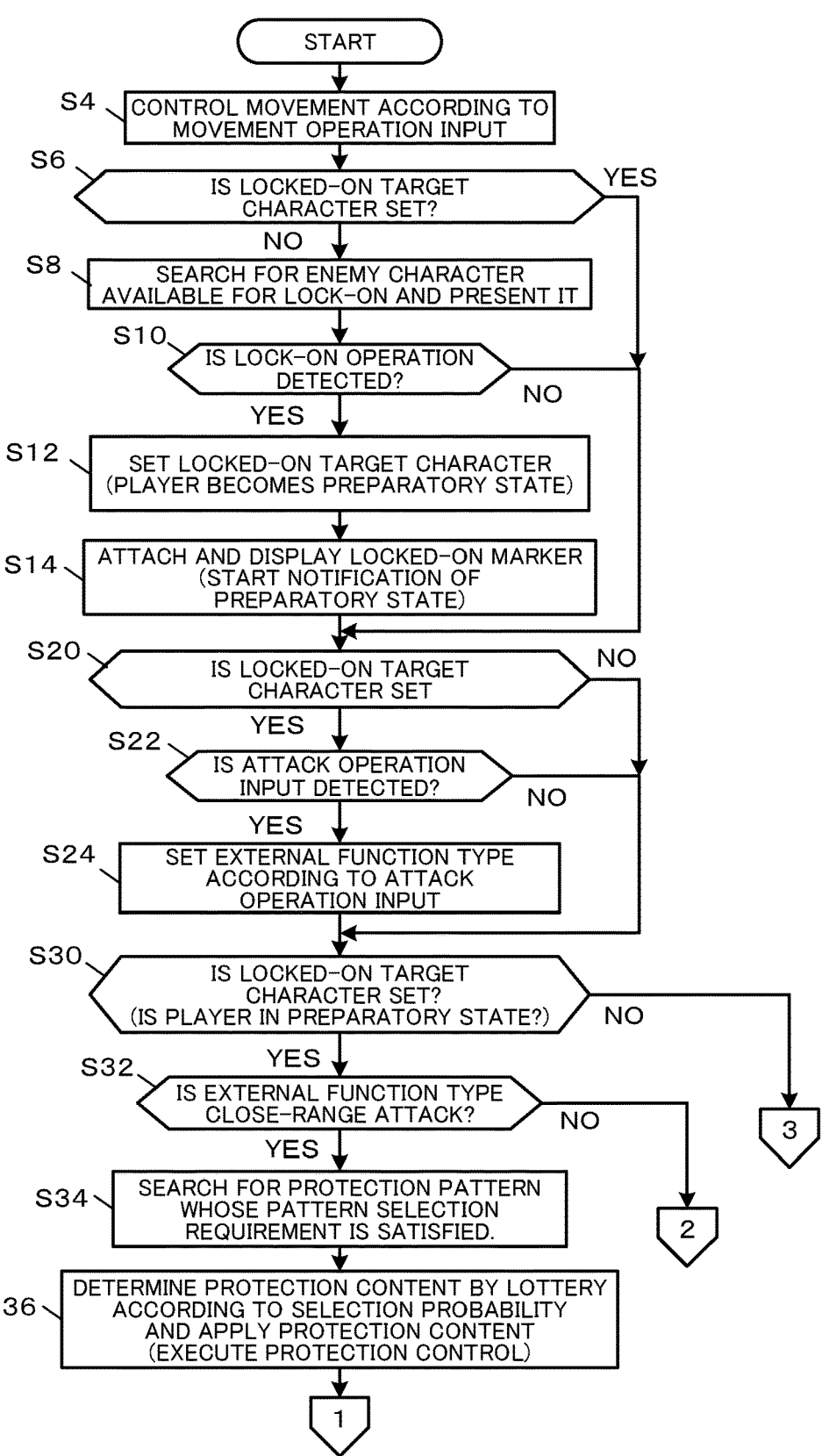
FIG. 12 is a flowchart illustrating a flow of a process executed for each movable player character in game progress control by the server system according to the first embodiment.
Figure 13:
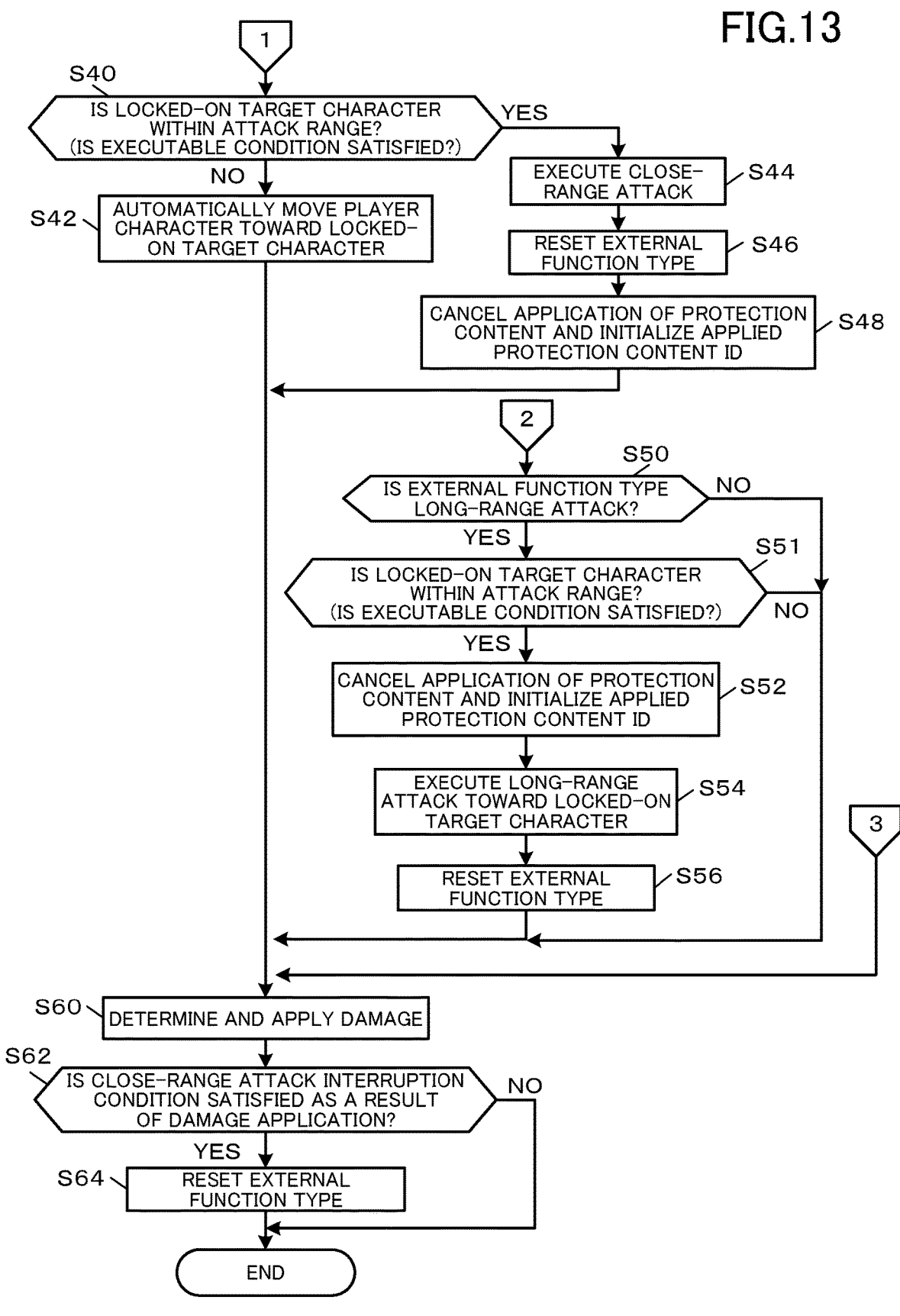
FIG. 13 is a flowchart continuing from FIG. 12.

FIGS. 12 and 13 are a flowchart that illustrates a flow of a process executed for each movable player character in game progress control by the server system 1100, and is repetitively executed in a predetermined cycle sufficiently shorter than a frame rate of a game screen.

Upon detection of operation input for moving the player character 4 by the player on the player terminal 1500, the server system 1100 moves the player character 4 according to the operation input (step S4).

Furthermore, when the player character 4 has not locked on any other character (No at a step S6), the server system 1100 searches for another character that can be locked on and presents the relevant character (step S8). Presentation is implemented, for example, by attaching and displaying a predetermined marker on the relevant character.

Then, when lock-on operation is input on the player terminal 1500 (YES at a step S10), the server system 1100 sets the locked-on target character ID 723 (step S12; see FIG. 10), and attaches and displays the locked-on marker 7 on the locked-on enemy character 6 (step S14; see FIG. 3). Accordingly, the player character 4 becomes the preparatory state that is a prerequisite for executing the external function, which is notified to the player by displaying the locked-on marker 7.

Furthermore, while the locked-on target character is set in relation to the player character 4 (YES at a step S20), upon detection of attack operation input on the player terminal 1500 (YES at a step S22), the server system 1100 sets the external function type 724 according to the type of the attack operation input (step S24; see FIG. 10).

Next, the server system 1100 determines whether the locked-on target character is set in relation to the player character 4, or whether the player character is in the preparatory state for executing the close-range attack in the present embodiment (step S30). In other words, the server system 1100 determines whether the player character is in the preparatory state that is a prerequisite for executing the external function indicated by the external function type 724 set at the time.

When the player character is in the preparatory state (YES at the step S30), and the external function type is set to the close-range attack (YES at a step S32), the server system 1100 searches for the protection pattern definition data 540 whose pattern selection requirement 550 is satisfied (step S34; see FIG. 5). Then, the server system 1100 refers to the relevant protection content definition data 560, executes a random lottery procedure (probability calculation procedure) considering the selection probability 564 as a winning probability to select the protection content 562 to be applied as the protection control, and applies the selected protection content 562 (step S36).

Referring to FIG. 13, the server system 1100 then determines whether the locked-on target character is within the attack range of the close-range attack (step S40). That is, the server system 1100 determines whether the executable condition of the external function indicated by the external function type 724 set at the time is satisfied. When the executable condition is individually set for each of the external functions, the server system 1100 searches for the external function definition data 525 of the external function type 724 at this step, and refers to the executable condition defined therein.

When the locked-on target character is not within the attack range (NO at the step S40), the server system 1100 comes to negative determination that the executable condition for the close-range attack is not satisfied, and automatically moves the player character 4 to approach the locked-on target character (step S42).

When the locked-on target character is within the attack range (YES at the step S42), the server system 1100 comes to affirmative determination that the executable condition for the close-range attack is satisfied, and causes the player character 4 to execute the close-range attack of the type indicated by the external function type 724 toward the locked-on target character (step S44). Then, the server system 1100 resets the external function type 724 to the initial value (step S46), cancels the application of the protection content 562 indicated by the applied protection content ID 725 to restore a state before the application, and resets the applied protection content ID 725 to the initial value (step S48).

When the server system 1100 determines that the external function type 724 is not set to the close-range attack (NO at the step S32), the server system 1100 determines whether the external function type 724 is set to the long-range attack and the locked-on target character is within the attack range (step S50 and step S51). When the executable condition is individually set for each of the external functions, the server system 1100 searches for the external function definition data 525 of the external function type 724 at the step S51, and refers to the executable condition defined therein.

Then, when the determination is affirmative (YES at the step S50 and YES at the step S51), the server system 1100 cancels the application of the protection content 562 indicated by the applied protection content ID 725 to restore the state before the application, and resets the applied protection content ID 725 to the initial value (step S52). Then, the server system 1100 causes the player character 4 to execute the long-range attack toward the locked-on target character (step S54), and resets the external function type 724 (step S56).

Next, the server system 1100 performs damage determination and damage application for the player character 4 (step S60). That is, the server system 1100 performs hit determination of the attack from another character, calculation of the given damage based on the attack determined to be a hit, and application of the calculated damage to the player character 4.

When the process reaches the step S60 through the steps S40 to S42, that is, when the protection content 562 indicated by the applied protection content ID 725 has been continuously applied, the damage caused to the player character 4 is calculated to be smaller than the damage in the case without the application. That is, even if the player character 4 receives the attack from another character while moving to approach the locked-on target character, the possibility of the interruption of the close-range attack due to the damage caused by the relevant attack decreases compared with the possibility without the protection control.

However, even with the protection control, when the applied damage satisfies a predetermined close-range attack interruption condition for interrupting the close-range attack (e.g., the hit points fall below a reference value as a result of subtraction of a damage value) (YES at a step S62), the server system 1100 resets the external function type 724 to the initial value, and interrupts the close-range attack (step S64). This prevents that the player character becomes a so-called invincible state during the approaching movement for the close-range attack and impairs the realism of the match.

On the other hand, when the process reaches the step S60 through the steps S44 to S48, that is, when the close-range attack has been executed toward the locked-on target character, the application of the protection content has been cancelled and the state before the application has been restored since the step S48. Accordingly, the player character 4 receives the normal damage based on the damage calculation without the protection when the player character 4 is damaged during the execution of the close-range attack.

Furthermore, also when the process reaches the step S60 through the steps S50 to S56, the application of the protection content has been cancelled and the state before the application has been restored since the step S52. Accordingly, the player character 4 receives the normal damage based on the damage calculation without the protection.

As described above, according to the present embodiment, it is possible to provide a user support technique for reducing a situation that the player character can not achieve an attempted external move toward the target character due to the external interference to the player character moving toward the locked-on target character.

In particular, as long as the player character is in the preparatory state satisfying the preparatory condition for executing the external function, the game system 1000 can protect the player character 4 from the interference by another character until the player character 4 establishes the positional relationship that should be satisfied for executing the external function. Specifically, in the situation of performing the close-range attack using the lock-on function, as long as the player character locks on the enemy character 6, the player character 4 is protected from the attack from another character (not only the locked-on enemy character 6 but also any other character) during the approaching movement until getting into the enemy character's 6 chest. As a result, it is possible to reduce occurrence of events that the close-range attack by the player character 4 is interrupted due to the damage caused by the attack received during the approaching movement.

Second Embodiment

Next, a second embodiment is described. The second embodiment is basically implemented similarly to the first embodiment. However, in comparison between the second embodiment and the first embodiment, each function of the game management is implemented in the server system 1100 in the first embodiment, whereas the game management is implemented in the player terminal 1500 in the second embodiment. The following mainly describes differences from the first embodiment. Components that are the same as the components in the first embodiment are denoted with the same referential numerals as those in the first embodiment, and duplicate description is omitted.

In the game provided by the server system 1100 according to the present embodiment, the plurality of characters appear similarly to the first embodiment. However, the characters except for the player character 4 are so-called non-player characters (NPCs) controlled by the computer.

FIG. 14 is a diagram illustrating a functional configuration example of a player terminal 1500B according to the present embodiment. Compared to the player terminal 1500 according to the first embodiment, the player terminal 1500B includes the game management section 210 in place of the player terminal control section 260.

The terminal storage section 500 according to the present embodiment stores a game program 504 and game initial setting data 510 in place of the client program 502. The terminal storage section 500 also acquires and stores information that is necessary for the game progress control and is included in the user management data 600 from the server system 1100 whenever necessary.

According to the present embodiment, the process described referring to FIGS. 12 and 13 in the first embodiment is executed on the player terminal 1500B. That is, an execution entity of the process in the description referring to FIGS. 12 and 13 can be replaced with the player terminal 1500B.

The present embodiment can also provide the same advantageous effects as those of the first embodiment.

MODIFICATION EXAMPLES

The embodiments to which the present disclosure is applicable have been described so far. However, the modes to which the present disclosure is applicable are not limited to the foregoing embodiments, and the components can be added, omitted, or changed as appropriate.

Modification Example 1

For example, the server system 1100 has the function of the game management section 210 in the first embodiment, and the player terminal 1500B has the function of the game management section 210 in the second embodiment. However, an intermediate configuration is possible. That is, based on the first embodiment, part of the function of the game management section 210 may be performed by the player terminal 1500. In reverse, based on the second embodiment, part of the function of the game management section 210 may be performed by the server system 1100.

Modification Example 2

Furthermore, according to the embodiments described above, the external function is exemplified by the close-range attack. However, content of the external function is not limited to this. The external function is a function affecting the target character and performed by the player character. Meaning of the external function in the game can vary depending on a relationship between the player character and the target character in the game, such as attack, healing, or rescue.

Figure 15:
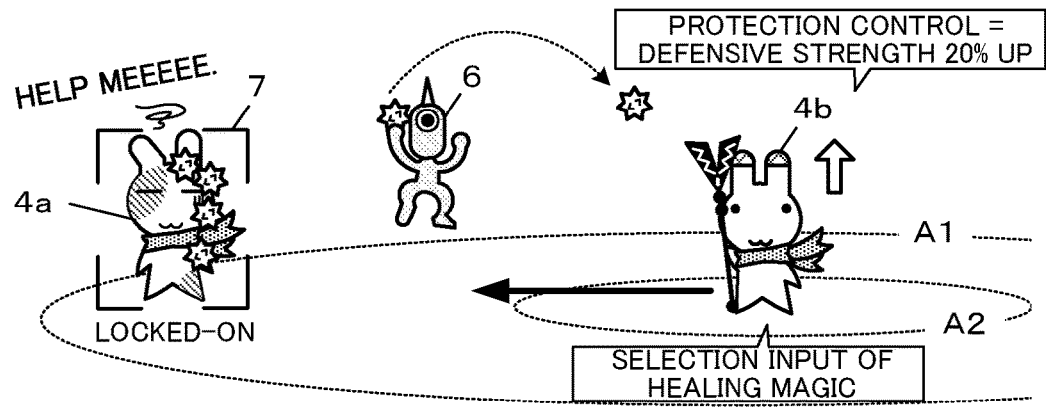
FIG. 15 is a schematic diagram (part 1) illustrating a modification example of the protection control.

In particular, as illustrated in FIG. 15 for example, assume that the game is an action roll-playing game where a plurality of player characters 4 (4a, 4b, . . . ) make a team to fight against an enemy character 6. A player character 4a is in a critical state due to the attack from the enemy character 6, and a player character 4b can use healing magic.

In this example, when the external function is set to the healing magic, the player of the player character 4b locks on the player character 4a that needs healing, and performs the operation input for executing the healing magic. Accordingly, the protection control is applied to the player character 4b, and motion control is performed such that the player character 4b automatically approaches the player character 4a.

Figure 16:
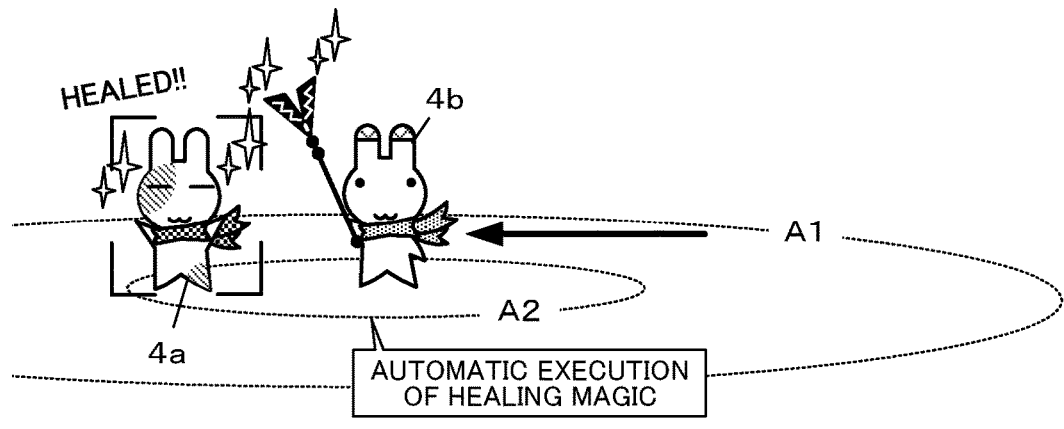
FIG. 16 is a schematic diagram (part 2) illustrating the modification example of the protection control.

Then, as illustrated in FIG. 16, the player character 4*b* is controlled to automatically execute the healing magic toward the player character 4*a* when the player character 4*b* approaches within an effective range of the healing magic.

With the protection control, the player character 4*b* is protected from the attack from the enemy character 6 during the automatic movement, and the damage caused becomes smaller than the damage without the protection control. As a result, it is possible to reduce occurrence of events that an act to help a friend is interrupted due to the damage caused by the attack received during the approaching movement.

Modification Example 3

Furthermore, according to the embodiments described above, automatic control is performed such that the player character 4 is immediately moved to approach the locked-on target character when the player performs the operation input for the close-range attack. However, the player may separately perform operation input for determining the timing to start the automatic control. That is, the flow of the process may further include a step for determining the detection of the operation input for starting the automatic movement between the steps S40 and S42 in FIG. 13. When this step is determined to be affirmative, the process may proceed to the step S42.

When this configuration is adopted, execution timing of the protection control at the step S36 in FIG. 12 may be transferred after the step S42 in FIG. 13. Accordingly, it is made possible that the protection control is executed only after the player character 4 starts approaching the locked-on enemy character 6. Since the protection control is not executed while the server system is on standby for the start timing of the automatic movement, it is possible to stimulate the player to quickly input the operation input for starting the automatic movement, and produce the game full of tension where a situation becomes more disadvantageous as the player takes longer to determine.

Although only some embodiments of the present disclosure have been described in detail above, those skilled in the art will readily appreciate that many modifications are possible in the embodiments without materially departing from the novel teachings and advantages of this disclosure. Accordingly, all such modifications are intended to be included within scope of this disclosure.

What is claimed is:

1. A computer system comprising:
at least one processor or circuit programmed to:
control execution of an electronic video game in which a player character is present, the player character being controllable in the electronic video game by a user via operations performed on a user terminal of the user;
detect a lock-on operation triggered by the user via the user terminal, set a lock-on state locking on a target character in the electronic video game, and display a lock-on marker in the electronic video game associated with the target character;
set the player character in a preparatory state in the electronic video game that satisfies a given preparatory condition for executing a given external function toward the target character in the electronic video game;
determine whether the player character satisfies a given executable condition in the electronic video game;

perform control for causing the player character to execute the external function upon determination of satisfaction of the executable condition; and
execute protection control for protecting the player character from an attack performed by another character while the player character is in the preparatory state,
wherein executing the protection control includes executing control for reducing a given damage amount to the player character caused by the attack from the other character as the protection control.

2. The computer system as defined in claim 1, wherein the at least one processor or circuit is further programmed to execute control for notifying a player that the player character is in the preparatory state while the player character is in the preparatory state.

3. The computer system as defined in claim 1,
wherein the executable condition is a condition that a positional relationship between the player character in the preparatory state and the target character enables execution of the external function, and a condition at least including that the player character approaches within a predetermined distance from the target character, and
wherein the at least one processor or circuit is further programmed to automatically move the player character to within the predetermined distance from the target character when the player character is determined to be in the preparatory state.

4. The computer system as defined in claim 1, wherein executing the protection control includes reducing the given damage amount by at least one of reducing offensive strength of the other character and enhancing defensive strength of the player character.

5. The computer system as defined in claim 1, wherein executing the protection control includes performing adjustment control of protection related to the protection control.

6. The computer system as defined in claim 5, wherein executing the protection control includes performing the adjustment control based on a positional relationship between the player character and the other character.

7. The computer system as defined in claim 5, wherein executing the protection control includes performing the adjustment control based on character information of the player character.

8. The computer system as defined in claim 5, wherein executing the protection control includes performing the adjustment control based on character information of the other character.

9. The computer system as defined in claim 5, wherein executing the protection control includes performing the adjustment control based on moving speed of the player character.

10. The computer system as defined in claim 5, wherein executing the protection control includes performing the adjustment control based on a geographical environment of a position of the player character.

11. The computer system as defined in claim 5,
wherein the external function includes a plurality of types, and
wherein the at least one processor or circuit is further programmed to previously select one of the plurality of types of the external functions to be executed when the executable condition is satisfied based on operation input by a player before the executable condition is satisfied, and wherein executing the protection control includes performing the adjustment control based on the type of the external function selected.

12. The computer system as defined in claim 5, wherein executing the protection control includes performing the adjustment control using a given probability calculation.

13. The computer system as defined in claim 12, wherein executing the protection control includes determining a probability related to an adjustment degree, and performing the adjustment control using a probability calculation according to the probability determined.

14. A game system comprising:

a server system that is the computer system as defined in claim 1; and an operation terminal used by a player to perform gameplay.

15. A game progress control method executed by a computer system for controlling progress of a game, the method comprising:

controlling execution of an electronic video game in which a player character is present, the player character being controlled in the electronic video game by a user via operations performed on a user terminal of the user;

detecting a lock-on operation triggered by the user via the user terminal, setting a lock-on state locking on a target character in the electronic video game, and displaying a lock-on marker in the electronic video game associated with the target character;

set the player character in a preparatory state in the electronic video game that satisfies a given preparatory condition for executing a given external function toward a given target character in the electronic video game;

determining whether the player character satisfies a given executable condition in the electronic video game;

performing control for causing the player character to execute the external function upon determination of satisfaction of the executable condition; and executing protection control for protecting the player character from an attack performed by another character while the player character is in the preparatory state, wherein executing the protection control includes executing control for reducing a given damage amount to the player character caused by the attack from the other character as the protection control.

\* \* \* \* \*